(12) United States Patent
Berger et al.

(10) Patent No.: US 7,721,643 B2
(45) Date of Patent: May 25, 2010

(54) AUTOMATIC POPCORN VENDING MACHINE

(75) Inventors: Thomas Berger, Story City, IA (US); Duane Bulanek, Marshalltown, IA (US); Bruce Nemec, Madison, WI (US); Jason Rohr, Pewaukee, WI (US); Tad Upah, Marshalltown, IA (US); Ryan Crist, East Troy, WI (US); Milton Dallas, East Troy, WI (US); Rizaldy Mata, Milwaukee, WI (US)

(73) Assignee: Paragon International, Inc., Nevada, IA (US)

( * ) Notice: Subject to any disclaimer, the term of this patent is extended or adjusted under 35 U.S.C. 154(b) by 1320 days.

(21) Appl. No.: 11/126,735

(22) Filed: May 11, 2005

(65) Prior Publication Data

US 2006/0288876 A1 Dec. 28, 2006

Related U.S. Application Data

(60) Provisional application No. 60/570,678, filed on May 12, 2004.

(51) Int. Cl.
*A23L 1/18* (2006.01)
(52) U.S. Cl. .................... 99/323.5; 99/323.9
(58) Field of Classification Search ... 99/323.4–323.11, 99/477
See application file for complete search history.

(56) References Cited

U.S. PATENT DOCUMENTS

| | | | | |
|---|---|---|---|---|
| 1,679,431 A | * | 8/1928 | Longino | 99/323.11 |
| 4,417,505 A | * | 11/1983 | Pietrobelli | 99/323.6 |
| 5,018,615 A | * | 5/1991 | Byrley | 194/241 |
| 5,419,238 A | * | 5/1995 | Pinone | 99/323.6 |
| 5,829,257 A | * | 11/1998 | Newman et al. | 62/73 |
| 6,008,728 A | * | 12/1999 | Wesey | 340/618 |
| 6,187,353 B1 | * | 2/2001 | Wyman et al. | 426/233 |

* cited by examiner

*Primary Examiner*—Sang Y Paik
(74) *Attorney, Agent, or Firm*—McKee, Voorhees & Sease, P.L.C.

(57) ABSTRACT

An apparatus, method, and system of popping popcorn. In one aspect of the invention, an apparatus comprises a popcorn popper, a popped popcorn hopper and a dispensing mechanism in communication with the hopper. By actuation, the dispensing mechanism dispenses one or more servings from the hopper. In another aspect of the invention, the apparatus further comprises a dosing mechanism to provide sequential doses of unpopped corn to the popper to make a plurality of batches of popped popcorn. In another aspect of the invention, a sensor sensing when popped popcorn in the hopper exceeds a pre-determined level or amount and instigates a signal to actuate the dosing mechanism to fill the hopper. In a system according to the invention, a self-contained cabinet includes the popper, hopper, dispensing mechanism and dosing mechanism, as well as a control circuit and actuators to operate the dosing mechanism and dispensing mechanisms. A method according to the invention comprises sensing amount of popped corn in the hopper, if determined needed, adding a single dose of unpopped corn to a popper and filling the hopper, and rechecking amount of popped corn in the hopper periodically.

27 Claims, 30 Drawing Sheets

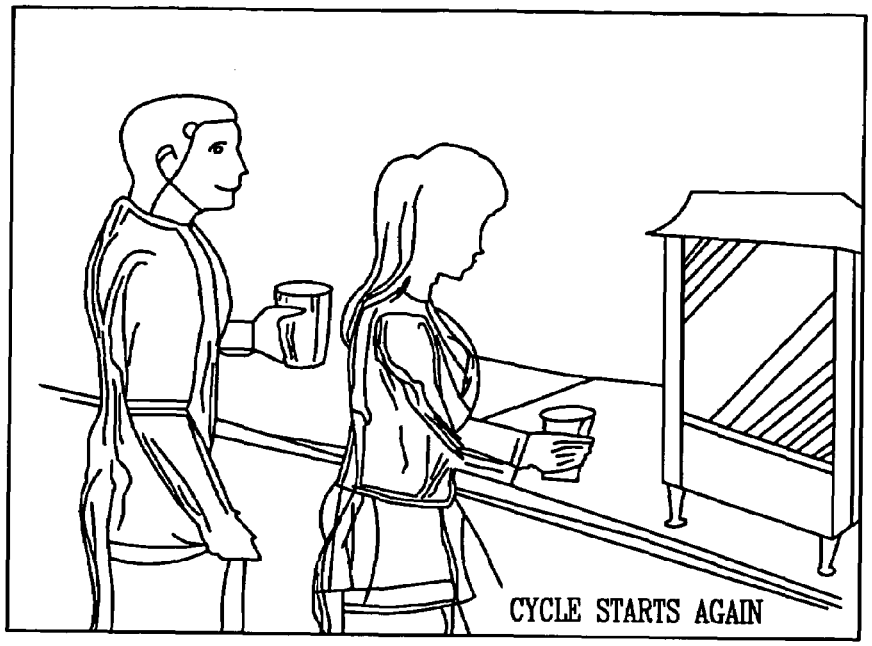
*Fig. 7G*
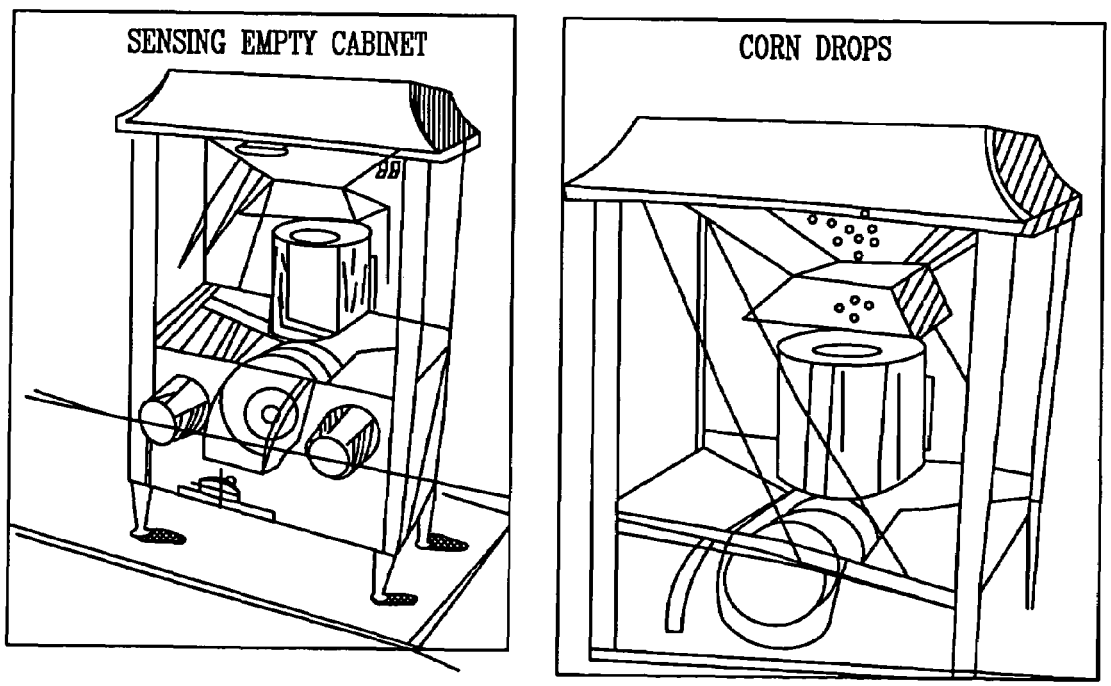
*Fig. 7H*   *Fig. 7I*

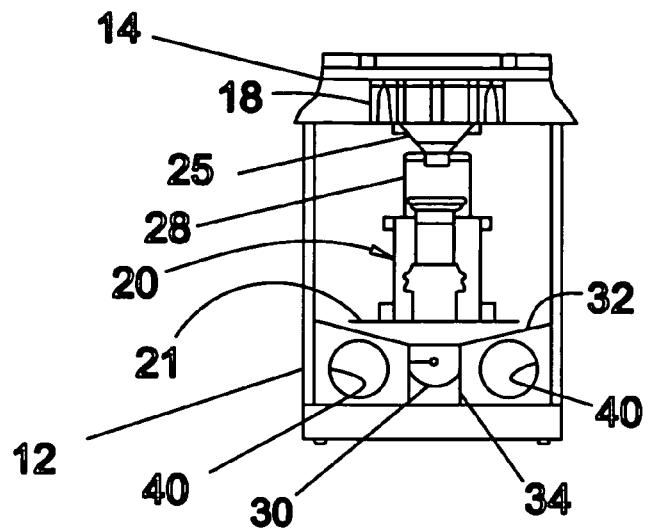
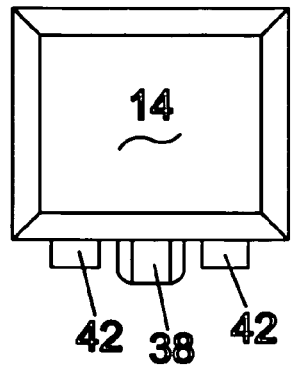
*Fig.8D*
*Fig.8C*
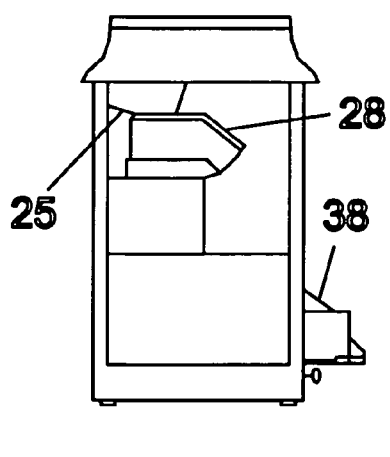
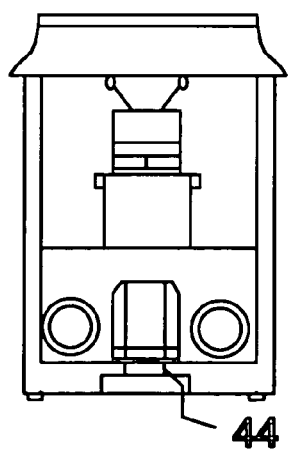
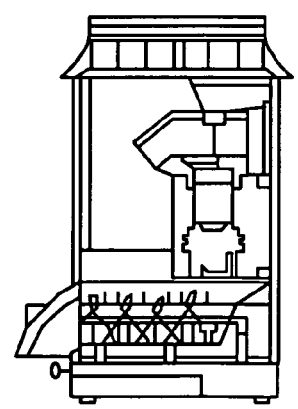
*Fig.8E*     *Fig.8F*     *Fig.8G*

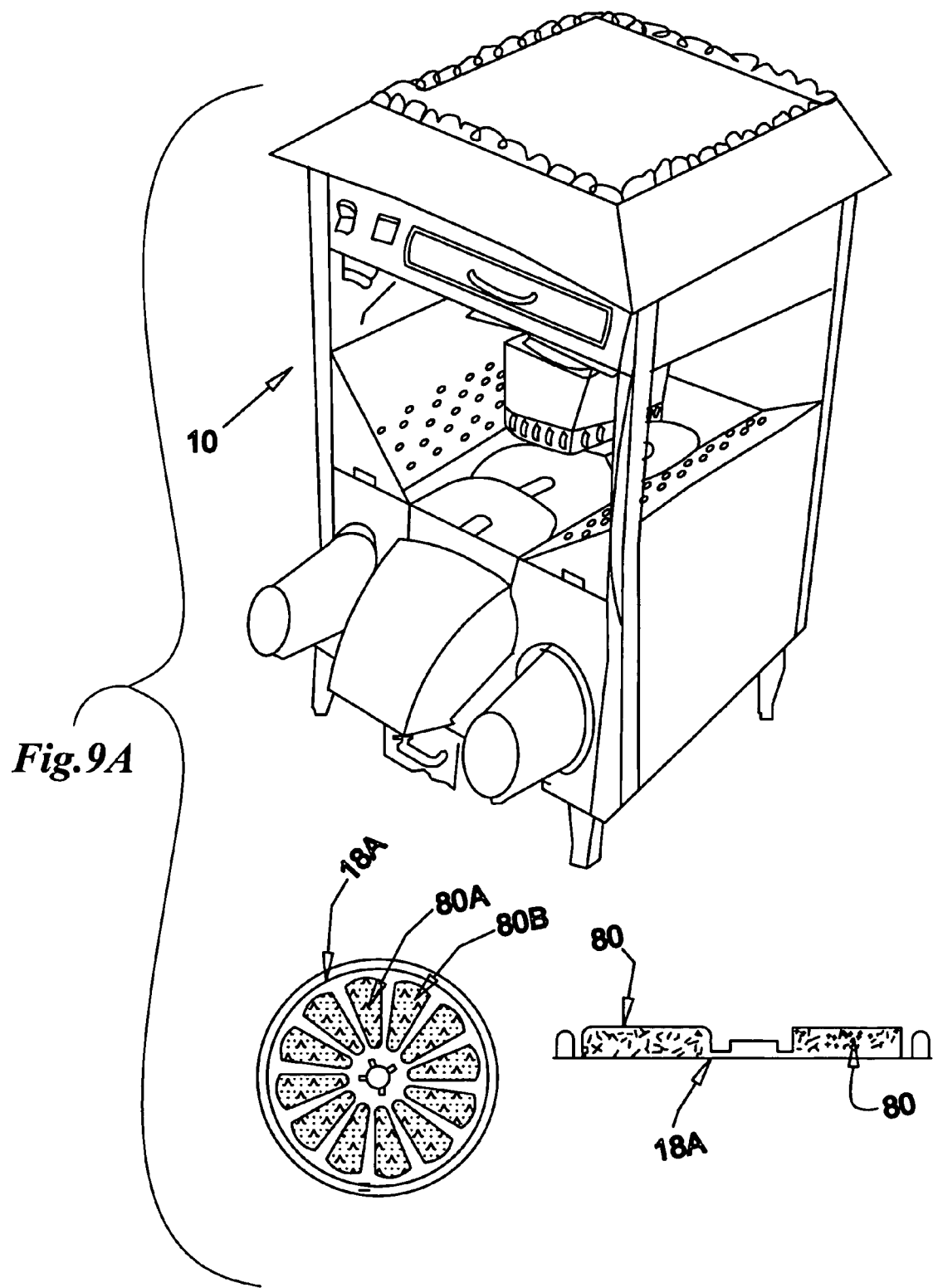

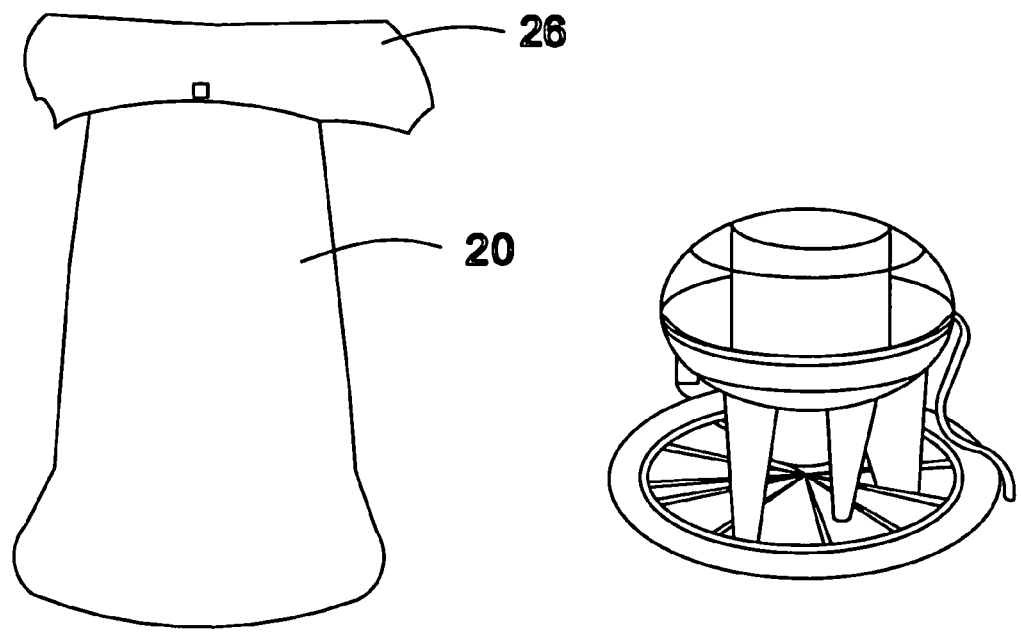
*Fig.14A*
*Fig.14B*
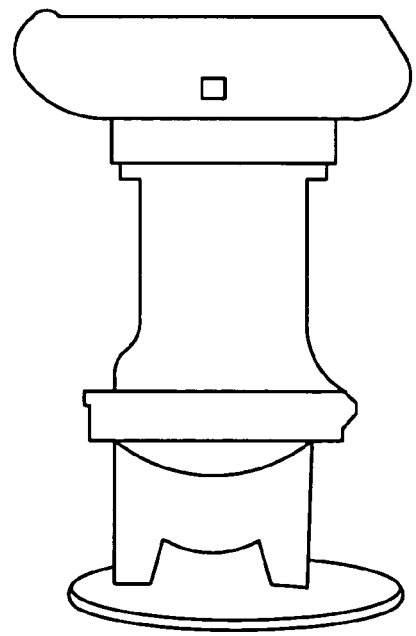
*Fig.14C*

AUTOMATIC POPCORN VENDING MACHINE

CROSS-REFERENCE TO RELATED APPLICATIONS

This application claims priority to U.S. Provisional Patent Application Ser. No. 60/570,678 filed May 12, 2004, which is incorporated by reference herein in its entirety.

BACKGROUND OF THE INVENTION

1. Field of the Invention

The present invention relates to popcorn machines, and in particular, to semi-automated or fully automated machines.

2. Problems in the Art

A variety of popcorn machines exist. Many home-use popcorn machines utilize a heated base and small cover in which individual batches of popcorn are made with the use of oil or the like. Hot air poppers for home use are also available. They generally discharge popcorn from a spout and are quite compact in size. They do not use oil to create the popcorn.

Larger popcorn machines, including those used for commercial endeavors, tend to have a larger housing or enclosure for storing popped popcorn. Conventionally, a kettle or bucket with a heating element requires the user to load popcorn seeds and oil or shortening into the kettle, monitor its progress, and pop new batches when popcorn in the enclosure is exhausted or close to be used up. Not only does this require relatively constant monitoring of the machine, but substantial effort and resources to maintain its operation. There are also issues regarding danger to the user (e.g., burns) and cleanliness issues (e.g., multiple opening and closing of doors to the popcorn and multiple hands handling the popcorn).

Relatively recently, there is a heightened awareness and concern regarding healthiness of foods. Because most conventional commercial poppers utilize some sort of oil or shortening, there is concern over the amount of fat, and healthiness thereof, for such popcorn. Air poppers do not utilize such oil and therefore have that advantage over oil or shortening based poppers. However, air poppers present logistic and labor issues where substantial amounts of popcorn on a continual basis are needed. They also produce a significant amount of heat that is distributed by the creation of hot air.

With respect to commercial level popcorn machines, there is a need in the art for automation of at least part of the operation of the machine. This would relieve workers or users from substantial effort of operating them. Also, a need has been identified for a practical semi-automatic or automatic commercial-size popcorn machine. Also, there has been identified a need for a machine that could precisely meter individual servings to customers instead of requiring the customer or an attendant to manually fill a customer's popcorn container. A need has also been identified for a self-contained, larger semi or fully automated popcorn machine that is modular in nature, having subsystems that can be interchanged.

SUMMARY OF THE INVENTION

It is therefore a principal object, feature, advantage, or aspect of the present invention to provide an apparatus, method, and system which improves over or solves certain problems and deficiencies in the art.

Other objects, features, advantages and aspects of the invention include an apparatus, method, or system which:

a) Requires very little operator interface and maintenance.
b) In at least one aspect will dose, pop, and dispense quality product to an operator or end consumers of the popcorn.
c) In one aspect can automatically sense when additional popcorn in a popped state is needed.
d) In one aspect can automatically provides a popping mechanism with a dose of popcorn.
e) In one aspect can carry multiple doses and provide them at either manually selected or automatically selected times.
f) Can be configured to dispense predetermined quantities of popped popcorn or on a user-selected continuous basis.
g) Provides a reservoir or inventory of popped popcorn "at the ready".
h) Is basically a self-contained unit.
i) Is reliable, economical, and efficient.
j) Is durable.
k) Is easy to setup, operator, and maintain.
l) Is flexible in function, and can be configured to meet a variety of user demands.
m) In one aspect, can be configured for essentially self-service by consumers.

The present invention relates to an apparatus, method, and system of semi-automated or automated popcorn production for consumption.

The invention in one aspect relates to an integrated machine that utilizes a corn popping mechanism. A source of popcorn seeds is adapted to provide the popper mechanism with a controlled dose for popping. In one aspect of the invention, this can be embodied in a multiple-dose carousel or tray. A mechanism can automatically release one dose at a time to the popper. The machine includes a housing to hold a bulk quantity of popped popcorn which is "at the ready" for dispension. In one aspect of the invention, a delivery mechanism is adapted to remove popped popcorn from the housing to a delivery point where a customer container can be automatically filled.

In another aspect of the invention, an electromechanical circuitry or system is provided which operates mechanisms to dispense doses of popcorn seed to a popper, monitor the level of popcorn in the housing, and operate dispension of popcorn to a customer container.

Methods and systems related to the above-described aspects are also included within the invention.

These and other objects, features, aspects, and advantages of the present invention will become more apparent with the accompanying drawings and description.

BRIEF DESCRIPTION OF THE DRAWINGS

FIG. 7A-I are similar to FIGS. 1-6, with similar sequential operational steps for an exemplary embodiment of a machine according the present invention.

FIGS. 8A-G include a perspective view of one exemplary embodiment of a machine according to the invention, an exploded view of that machine, and various plan and sectional views of that machine.

FIGS. 9A-F are perspective views of alternative exemplary embodiments of the present invention.

FIGS. 14A-C are illustrations of a hot air popcorn popper, and components from it, that can be used with an embodiment of the present invention.

FIGS. 15A and 15B-1, 15B-2 and 15B-3 is a flow chart illustrating an example of steps of operation of a machine according to an exemplary embodiment of the invention.

DETAILED DESCRIPTION OF EXEMPLARY EMBODIMENTS

Overview

Figure 1A:
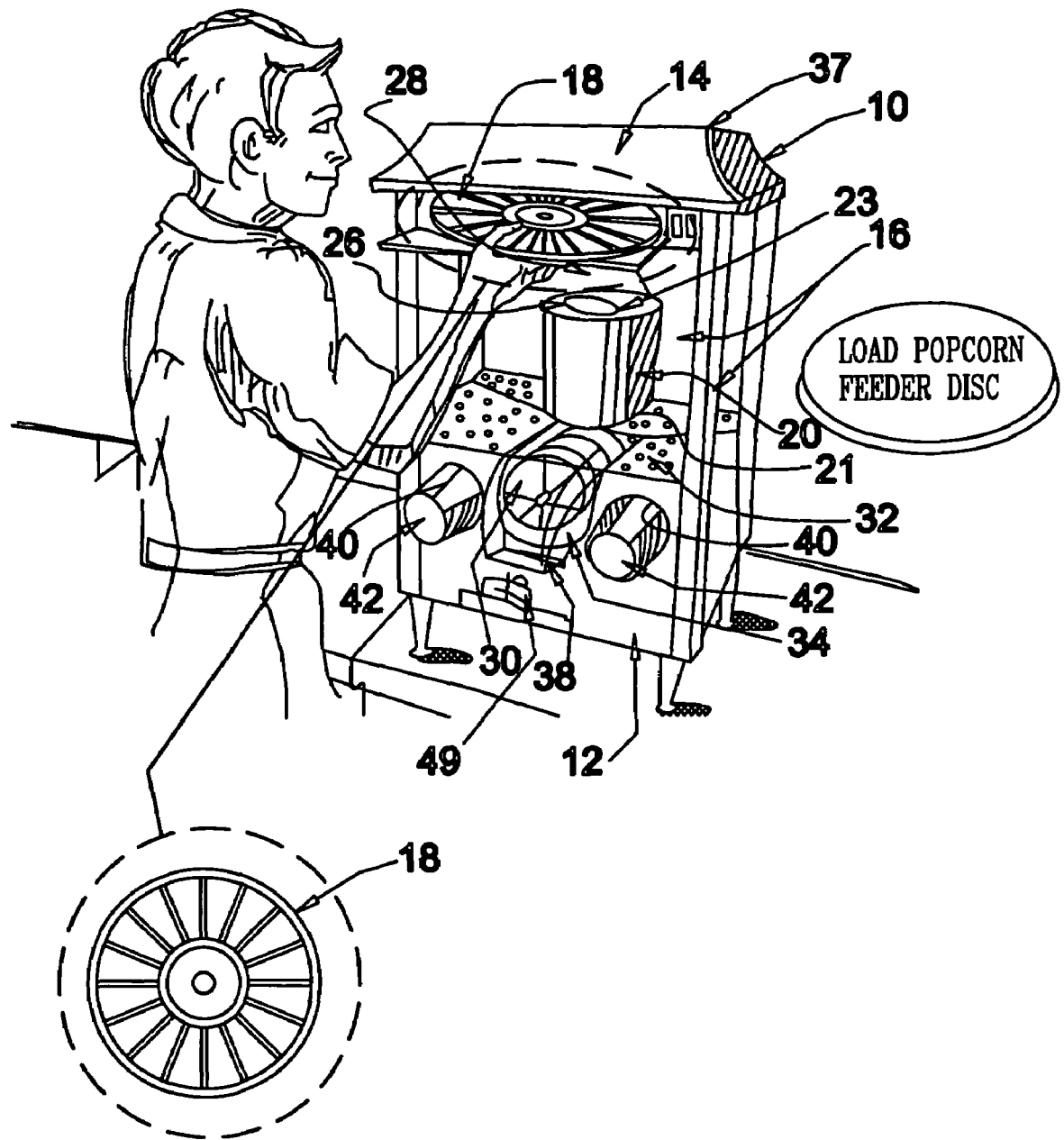
FIG. 1A is a diagrammatic depiction of a machine according to one aspect of the present invention, illustrating an initial loading step of a multi-dose raw popcorn cassette into the machine.

For a better understanding of the invention, exemplary embodiments will now be described in more detail. Frequent reference will be taken to the appended drawings or figures, which are identified by Figure Number.

Reference numerals will be used to indicate certain parts and locations in the figures. The same reference numerals will be used to indicate the same or similar parts or locations throughout the figures, unless otherwise indicated.

The invention, in general, relates to an apparatus, method, and system for automatic or, at least, semi-automatic popping and dispensing of popped popcorn. The invention can take many forms and embodiments. The exemplary embodiments presented herein are not by way of limitation to the invention, but rather are to provide more specific examples of some of the ways the invention can be made and operated. Variations obvious to those skilled in the art will be included within the invention.

One goal of exemplary embodiments of the invention is to provide a system that requires very little operator interface and maintenance. The system, in one aspect, can dose, pop, and dispense quality popped popcorn according to high standards.

By "dose" it is meant the function of providing a predetermined quantity of unpopped popcorn seeds to a popping mechanism. As will be discussed in more detail later, in one aspect of the invention, the dose can be prepackaged and accessed or otherwise caused to be placed in a popper. Preferably multiple doses would be available so that multiple batches of popcorn can be popped sequentially when instructed or needed, and a worker would not have to manually load a dose of raw popcorn kernels into the machine each time a batch is popped.

By "pop" it is meant any method of causing unpopped popcorn seed to pop into popped popcorn. One exemplary embodiment is an air popper. It eliminates the requirement of using oil or some other substance, which presents both handling and cleaning issues. It also eliminates the health issues with respect to popcorn made with oil, shortening, or the like. However, other forms and mechanisms of causing the corn to pop are within contemplation of the invention.

By "dispense" it is meant the function of withdrawing from the machine a quantity of popped popcorn and making it available to an operator or an end-use consumer. An end-use consumer could be, for example, a customer at a convenience store or a sporting event, a cafeteria patron, or a vending customer.

Exemplary Embodiment of Apparatus

Generally

FIGS. 1-12, and particularly FIGS. 8A-K, illustrate a first exemplary embodiment according to the present invention. The general popcorn machine 10 has a housing including a base 12 sized and configured to be set upon a supporting surface such as a counter or table, a cover 14, and an intermediate frame and glass walls 16, all forming an enclosure or cabinet with an interior volume or space. Like many conventional larger, self contained popcorn machines, the interior volume or space functions, in part, as a container for a substantial amount of popped popcorn.

Machine 10 has three major sub-systems in its housing. First, a raw popcorn kernel dosage subsystem to feed "doses" (e.g. 4 ounces of raw popcorn kernels) to a popper. Second, a hot air popping subsystem to cook (pop) the raw kernels. Third, a popped corn dispensing subsystem to deliver a quantity of popped corn to one or more end-users.

The basic housing or cabinet of machine 10 can take many forms and configurations. For aesthetic purposes (customer view of freshly popped popcorn) glass walls 16 can be used. The basic cabinet can be essentially the same as an off the shelf Model No. 1911-18 cabinet available from Paragon International, Nevada, Iowa. One change that may be indicated is to place some sort of an air vent in cover 14, especially if an air popper is used.

Figure 8A:
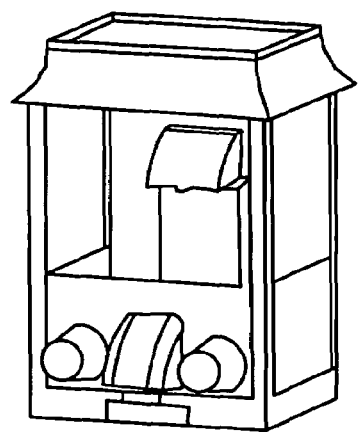
Figure 8B:
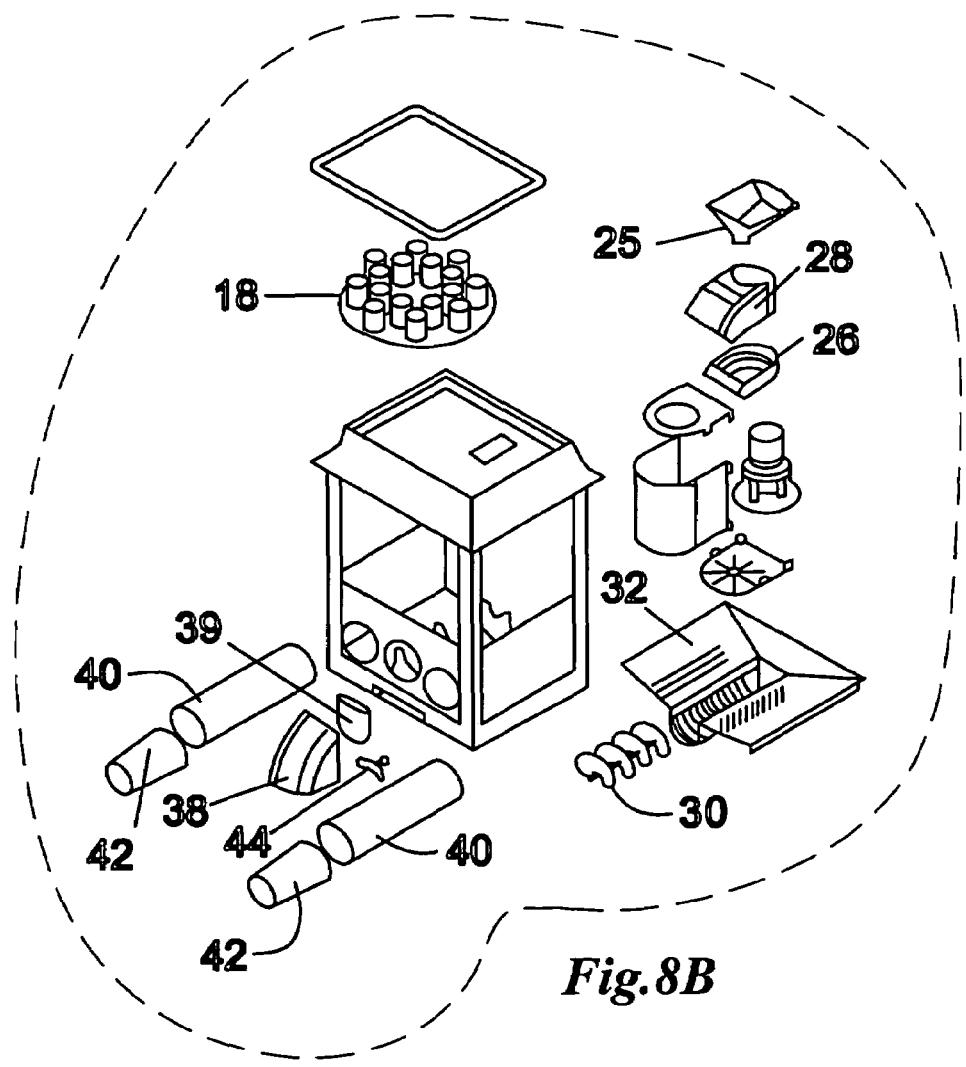

FIG. 8B illustrates the basic components of an apparatus 10. The housing would hold or enclose a multiple dose cassette or carrousel 18 and associated motor and structure to turn carrousel 18. As will be described later, a mechanism for opening or accessing each cup of carrousel 18 would also be included, likely in the cover 14 of device 10. A removable overlay (see FIG. 8B) could be used to access carrousel 18 and remove and place carrousel 18.

A popper 20, here an air popper, by either a shelf or bracket (see, e.g., the bracket 21 illustrated at the right side of FIG. 1B), could be mounted inside the enclosure. One example is basically an off-the-shelf or slightly modified Presto Poplite, Model No. 04820N0.07 (see FIGS. 14A-C). The air popper basically consists of a main unit (see FIG. 14B) comprising a popping chamber with a fan and heating element 27 below and a cap or top portion 26 above. A cover 28 can be placed over the top of the popper to receive unpopped seeds into the popping chamber through an opening but direct popped corn laterally out from the popper. Other parts, including an enclosure for the working elements, can be included.

What will be called drop pan 32 is installed at or near the bottom of the enclosure. It can include inwardly sloping surfaces and a bottom channel to cause popcorn to move by gravity into the channel. Openings or slots can exist in the drop pan 32 through which "old maids" (unpopped or partially popped seeds) can fall into a discard location or removable pan. A drip pan or "old maid" pan could be removably positioned under drop pan 32 to allow the operator to conveniently remove debris at selected times.

An auger 30 is positioned in the channel of drop pan 32. An actuator or motor would operate to turn auger 30 to move popped popcorn laterally out of apparatus 10.

A dispensing shroud 38 is attached to the front of the enclosure and aligned with the exit or distal end of auger 30. Some sort of flapper or hinged piece would hang vertical by gravity to hold in popped popcorn around the distal end of auger 30 until auger 30 operates to push it out of the way with moving popcorn. A plunger 44, spring loaded to extend outwardly from the enclosure, would have a plunger end that would operate a switch to activate auger 30 when a user pushes it inwardly.

Cup holders 40 are positioned in the housing underneath drop pan 32 to hold a plurality of cups 42. As will be discussed in more detail, a user or customer can take a cup, hold it against plunger 44, and activate auger 30 to dispense popcorn into cup 42 through dispensing shroud 38.

FIGS. 8A-G collectively illustrate how the foregoing parts are combined into a self-contained apparatus 10. The basic concepts of apparatus 10 include:

a) Three major subsystems namely, 1) raw kernel dosage—4 ounce per dose preferred; 2) hot air popping system; and 3) popcorn dispensing.

b) The embodiment was designed with the following parameters or "rules" in mind:

1) The system should be capable of dosing roughly 4 ounces of raw kernels into the popping reservoir of popper 20. Raw corn kernels should then be popped using traditional hot air popping technology. It is important all kernels be completely evacuated at the end of each popping cycle.

2) To dispense popcorn, an end user will press a standard 64 ounce paper cup into a standard "U" shaped plunger-type activation system. The system must also consider and accommodate dispensing of "old maids" into a pan located at the front of the system.

3) It is not believed desirable to have any functional features on either side or at the rear of the popping system. Additionally, the complete system preferably should work within approximately a 1500 watt power range.

4) The dosing system can take many forms. It is important that raw kernels do not get trapped or blocked between their stored location and the popper.

5) A variety of hot air popper devices have been identified as acceptable. Testing was done to select a candidate off-the-shelf popper that has minimal kernel loss. The design preferably should utilize some cover system that returns unpopped kernels to the popping reservoir (unpopped kernels not to be confused with "old maids"). Advantages to such a cover include limitless forms or configurations such as sport helmets (see e.g. FIG. 11B), location for company or store logos, and visually attractive, dynamic hood actions generated from the air blast of the popper.

6) Once the corn has been popped, it is preferable to control the end products flow and fill pattern within the enclosure. With control, popped corn and kernels can be directed towards their desirable dispensing areas. An important aspect is the directing of quality popped corn to the dispensing head or feed system and "old maids" to drop zones. Obviously it can be challenging to obtain 100% "old maid" capture. Therefore, multiple drop zones within the enclosure and within the dispensing or feed area have been identified. Once the end-user activates the system feed plunger, the dynamics of the selected dispensing system will direct the popped corn to the spout or dispensing shroud 38, past the one-way flapper door 39, and into the end user's 64 ounce cup 42.

7) During tests, it was determined sound level for hot air popping systems can be relatively loud. Sound deadening features should be considered for device 10.

8) Systems range in power consumption from 1200 watts to 1500 watts. It is preferable the wattage be around the 1440 range (12.5 A at 120 VAC). Special considerations may be given to manage power consumption (e.g., run only certain things at certain times, like turn popped corn warmers off when popper is running).

More specifics of the subsystems will now be described.

Specifics Regarding Raw Kernel Dosage Subsystem

In the exemplary embodiment, multiple prepackaged doses of unpopped popcorn seed are contained within what will be called cassette or carrousel 18. In FIG. 8B, carrousel 18 is a self-contained, pre-manufactured circular unit having sixteen inverted cups with open bottoms. A bottom piece is adhered or otherwise connected to the circular top piece to hold the raw popcorn seeds in.

By cutting or puncturing the area underneath a cup, seed from that cup will fall by gravity. The material underneath each cup can be frangible, weakened, scored, perforated, or otherwise openable to dispense by gravity all the seed.

Figure 1B:
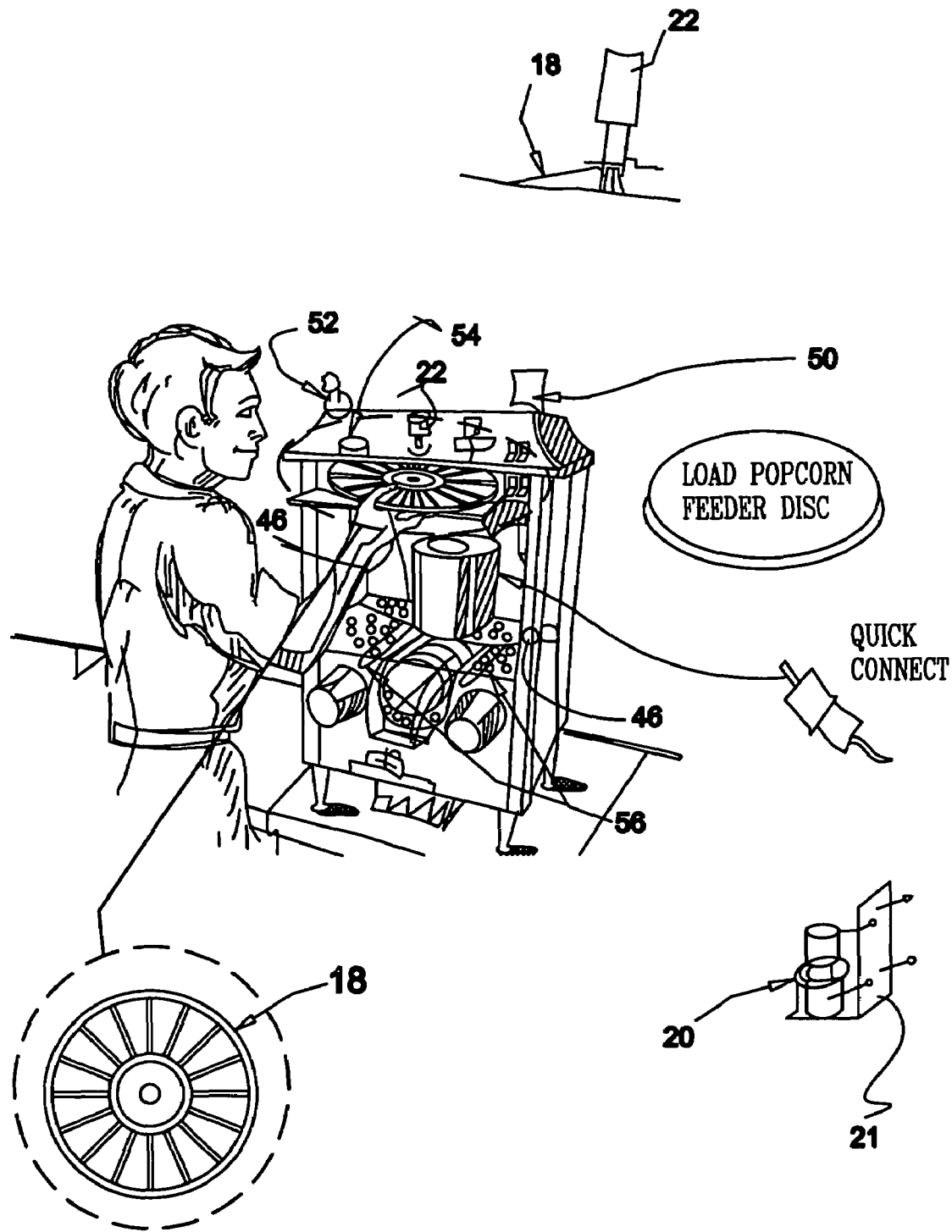
FIG. 1B is similar to FIG. 1A but includes additional details and possible features of such a machine.

Once inserted as shown in FIG. 1A above the popper mechanism 20, carrousel 18 can be indexed and rotated. As indicated by the sketch in the upper right hand corner of FIG. 1B, there could be a notch or other self-indexing structure in cassette 18 that allows it to only be installed in one orientation in machine 10. And further, a motor 22 could have a rotating axle with a complementary end that locks into the notch or self-indexing structure at the center of cassette 18.

Figure 8H:
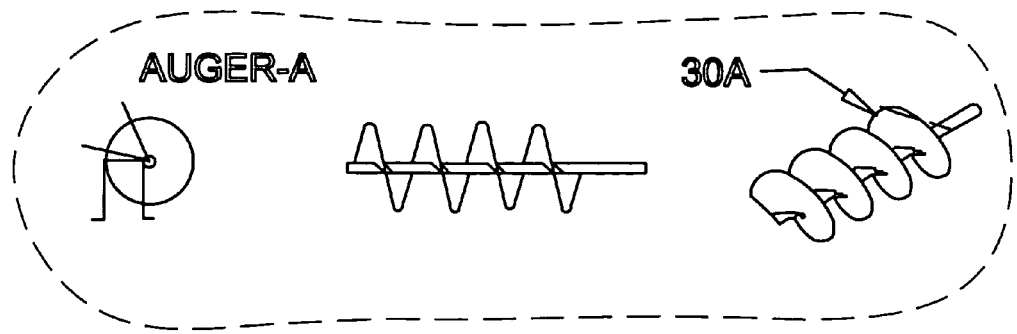
FIGS. 8H-K are various enlarged views of parts and alternatives for those parts that could be used with the embodiment of FIGS. 8A-G.
Figure 8I:
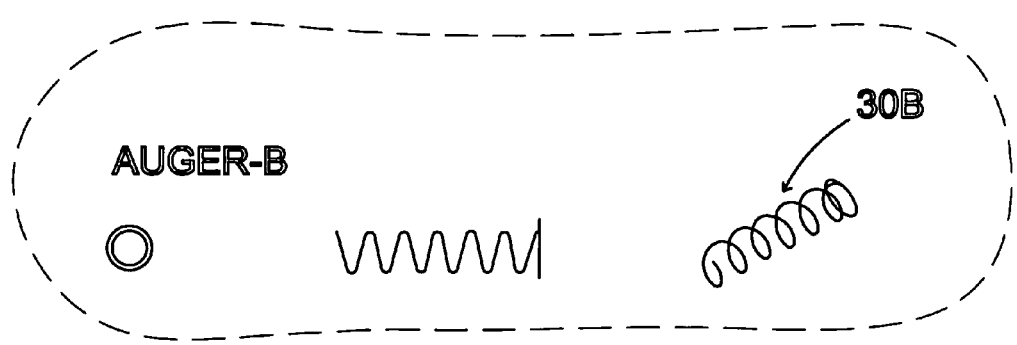
Figure 8J:
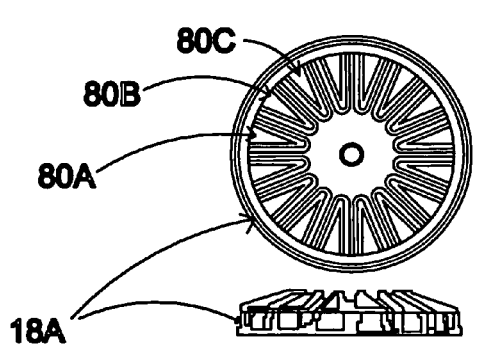
Figure 8K:
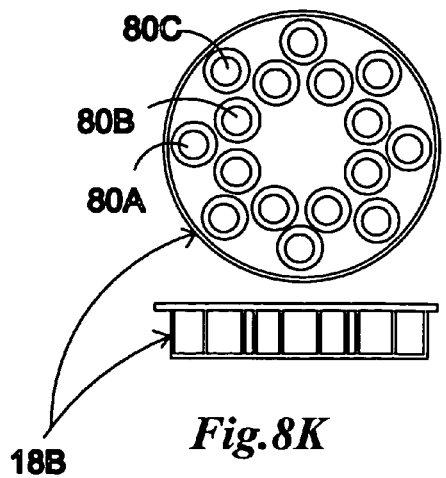
Figure 9B:
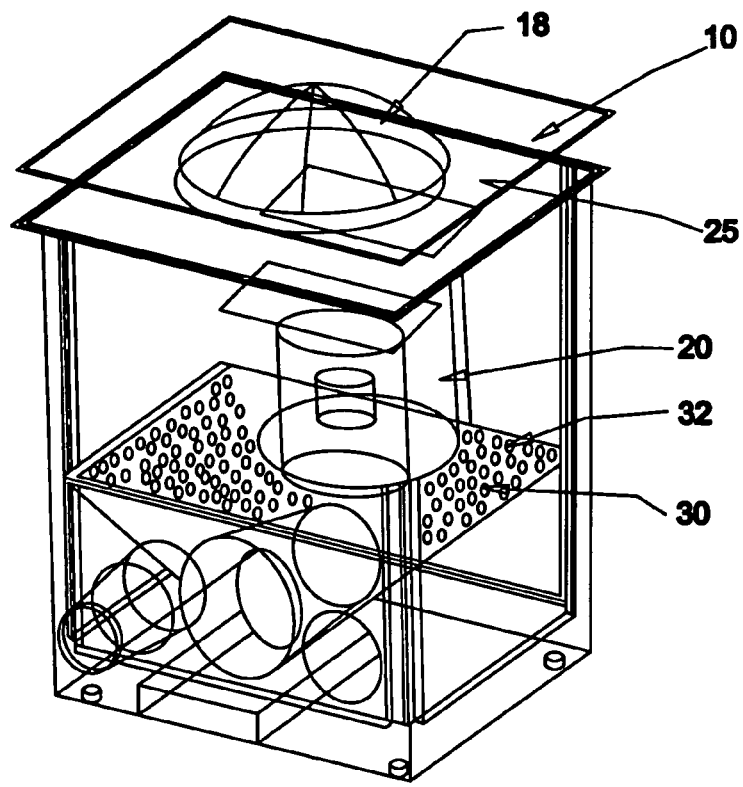
Figure 9C:
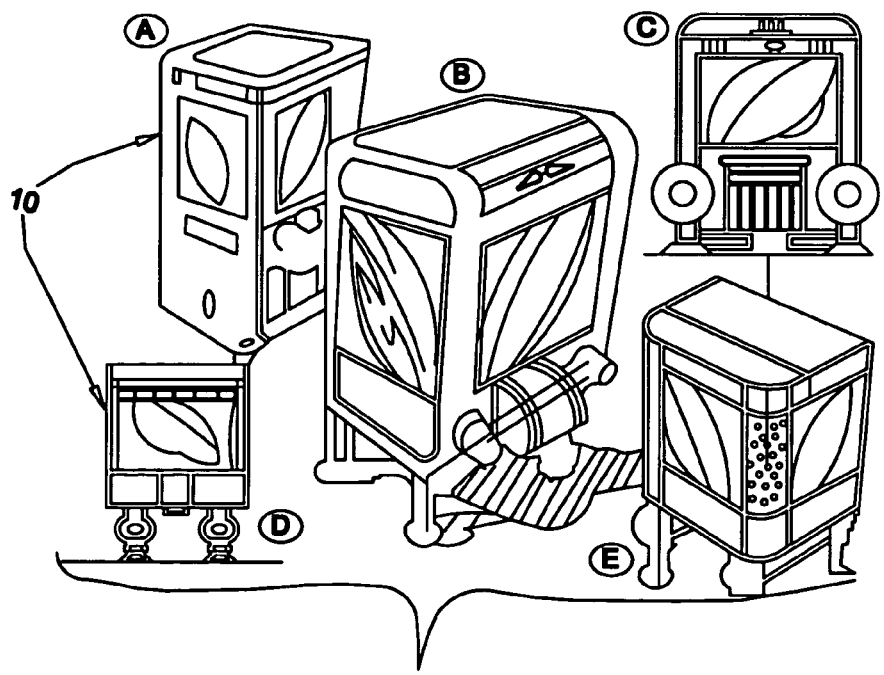
Figure 9D:
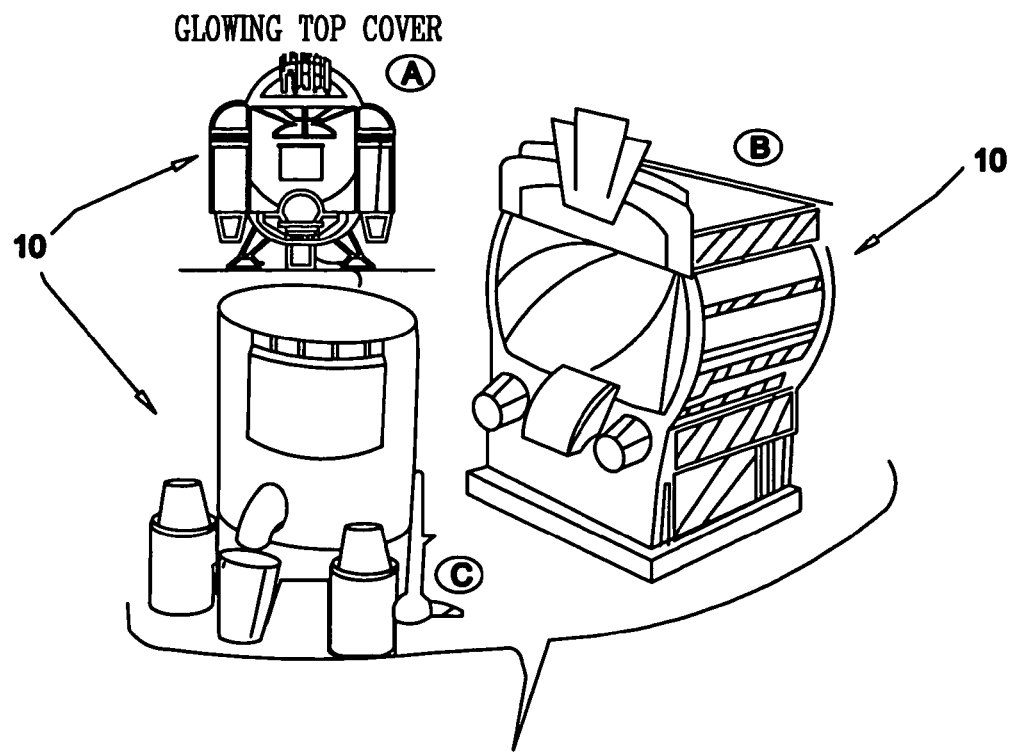
Figure 9E:
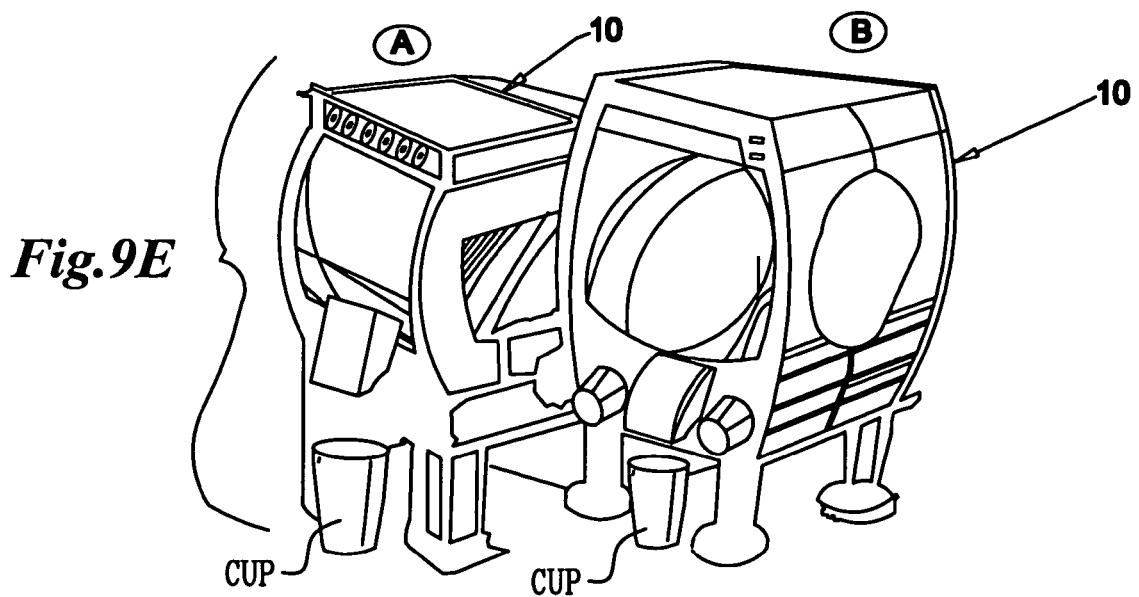
Figure 9F:
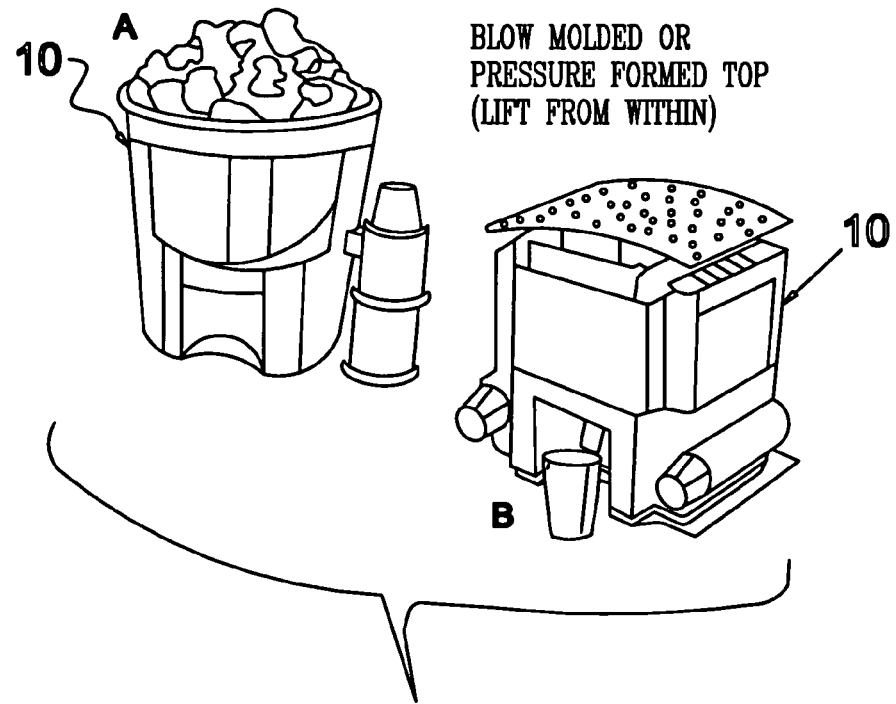

Each cup of cassette 18 is spaced every 22.5° around the diameter of the circular cassette shape (see FIG. 8K). By an appropriate mechanism (e.g., electrical motor 22), carrousel 18 can be rotated 22.5° for each popping cycle to align a cup with either a conduit or directly over the opening to the interior of the popping mechanism 20. In this manner, multiple pre-measured doses of popcorn seed is available by the machine to automatically load popper 20 for each batch of popcorn.

As can be appreciated, carrousel 18 can be made of different materials. One example is vacuum or thermo formed plastic for both the top portion (with the cups) and the bottom portion (e.g. polyethylene, food grade, 10-20 thousandths of an inch thick). Alternatively the bottom could be more heat resistant or reflective (e.g. tin foil). The tin foil would help reflect heat that would be experienced from the hot air of popper 20. The bottom sheet could alternatively be some other material. Alternatively, the bottom could be aluminum or tin foil with a thin film of perforated plastic on the back of tin foil. The bottom could be shrink-wrapped or adhered by adhesive to the top portion. The method of adhesion needs to withstand temperatures up to 400° F. as well as freezing (to preserve the prepackaged popcorn, it may be frozen until needed). Thickness and type of material would be selected to get as much rigidity and heat resistance as needed for the machine. Paper might even be an option. There could be perforations or other engineered structural features in the bottom of the cassette to help control the release or the discharge of seed from the compartments.

In the embodiment shown in FIG. 8, carrousel 18 is positioned generally directly above air popper 20. It could be moved to the side to try to move it away from the rising heat from air popper 20.

One benefit of a self-contained carrousel 18 such as shown in FIG. 8B is that the doses are pre-measured. No type of metering device is required to measure the right amount of seed into the popper. A cup, with one dose, is simply dispensed into the popper. When all cups have been exhausted of seed, carrousel 18 is merely withdrawn from machine 10 and replaced with a new one. This makes operation and cleaning of machine 10 easier.

FIG. 8B illustrates a cup style carrousel 18. It is also shown in more detail at FIG. 8K. As can be appreciated, other configurations are possible.

For example, FIG. 8J shows an alternative embodiment. It also is a blister pack arrangement, with a top portion and a bottom covering portion. It differs, however, in that it utilizes adjacent pie-piece shaped raw kernel holding compartments instead of cups, again each at 22.5°.

Figure 10A:
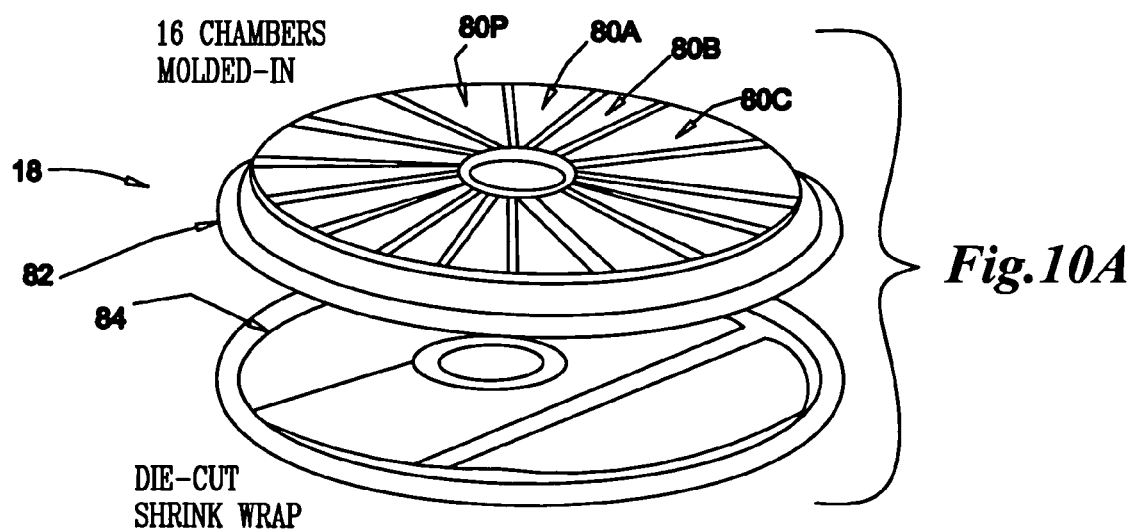
FIGS. 10A-D are alternative designs for multiple dose popcorn seed containers for use with an embodiment of the present invention.
Figure 10B:
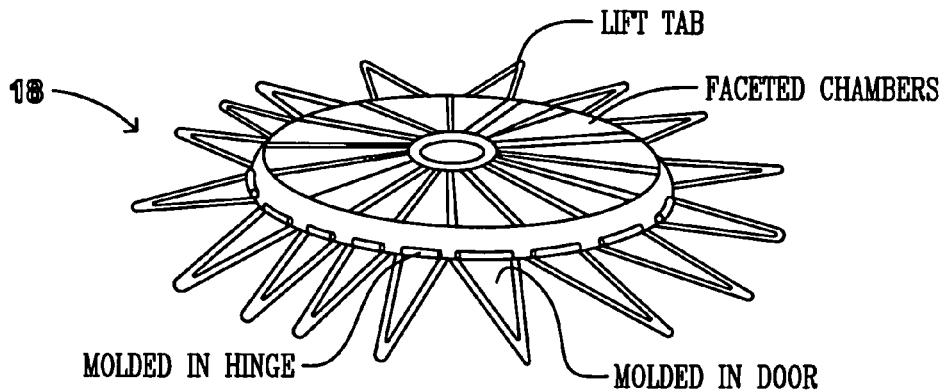

FIGS. 10A-D illustrate additional embodiments of cassettes or carousels 18, as well as specifics regarding how each compartment could be automatically accessed to dispense a 4 ounce dose to the popper. FIG. 10A shows another pie-piece type that would have a bottom cover that could be cut or punched open to drop seed. FIG. 10B shows another pie-piece type but of one piece. Molded-in plastic doors, each with a living hinge connecting it to the top portion, can be folded under to hold in the seed in the pie-piece shaped compartments. The doors tips and/or sides could have adhesive to hold them in place. Alternatively, the doors could have interference fit or snap fit in place. To release the seeds from a compartment, the door would just need to be pulled or punched.

Figure 10C:
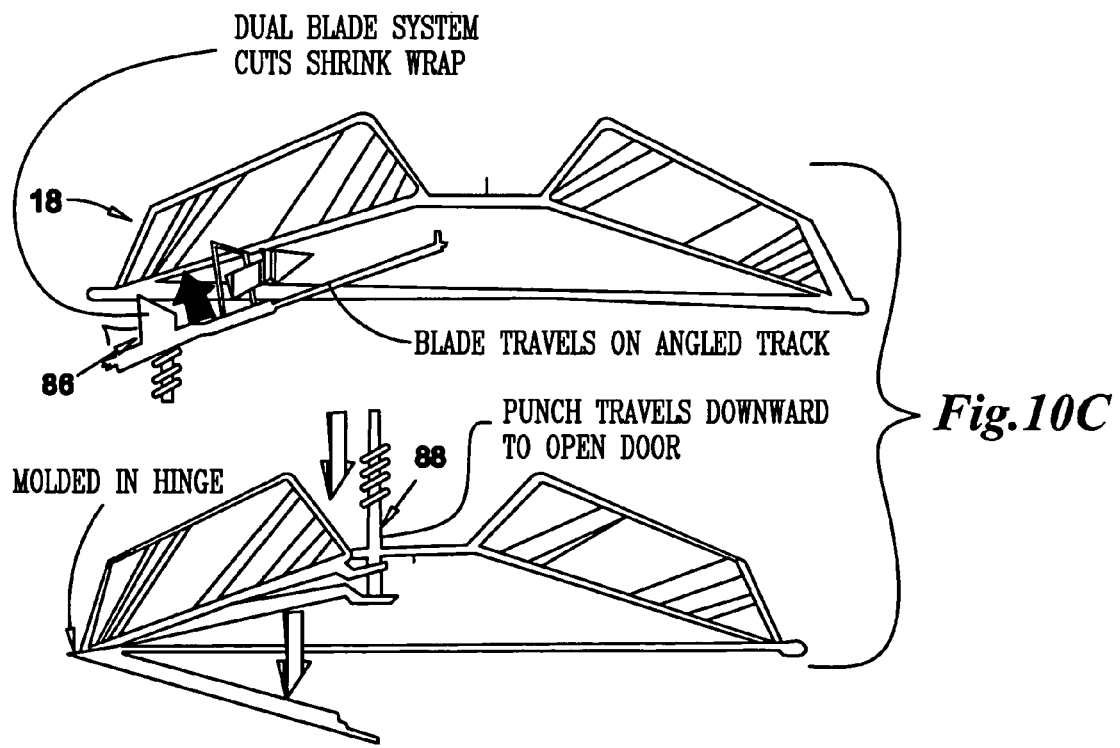

FIG. 10C illustrates several ways to open a seed compartment of a cassette 18. "Concept A" at the top of FIG. 10C diagrammatically shows how to cut open, slice, or smash a bottom cover to release seed from a compartment. A spring loaded blade 86 could travel on an angled track. By appropriate actuators, it can be moved up and puncture the outer, underneath part of one of the cups or pie shaped raw kernel compartments, and then be moved along the track to slice open at least a substantial part of the bottom of that compartment. Raw corn kernels, by gravity, would fall directly into popper 20 or through some directional structure into popper 20.

"Concept B", in the lower part of FIG. 10C, shows an alternative for opening a hinged door such as shown in FIG. 10B. A single action punch 88 could move down and release a molded-in hinged door forming the underneath of a cup section to release the raw kernels.

Figure 10D:
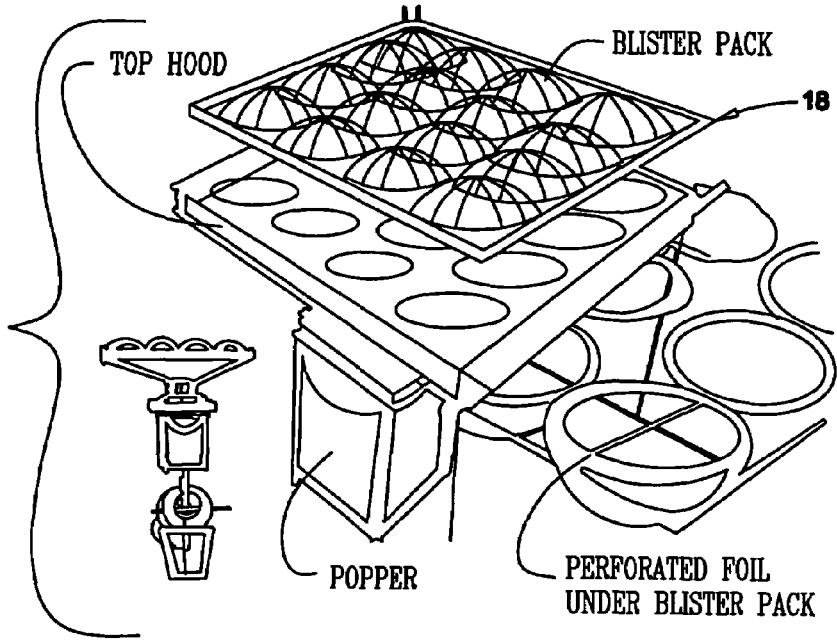

FIG. 10D shows a still further embodiment of a multi-dose cassette 18. Sixteen bubble-shaped compartments having perforated foil over their bottom can be arranged on a rectangular member. Some sort of device can move along and puncture or smash sequentially the perforated foil to release each dose of seed from the pack, into a funneling hood that would direct it to the popper. The device could be a moving plunger that could be positioned anywhere in an X-Y plane by appropriate instruction.

An entire cassette 18 could be shrink-wrapped in cellophane to deter inadvertent release of seed from cassette 18 before insertion into machine 10. The wrap could be taken off prior to placing cassette 18 into machine 10.

Specifics Regarding Hot Air Popping Sub-System

One specific example of a hot air popper has been previously identified. See also FIGS. 14A-C. Other similar off-the-shelf, commercially available hot air poppers might be used. Literally, an off-the-shelf air popper, without modification, could be mounted in device 10. Or, alternatively, the inner workings of the popper could be utilized and the normal housing and other parts of the commercial version of the popper removed, changed, or simulated.

Figure 11A:
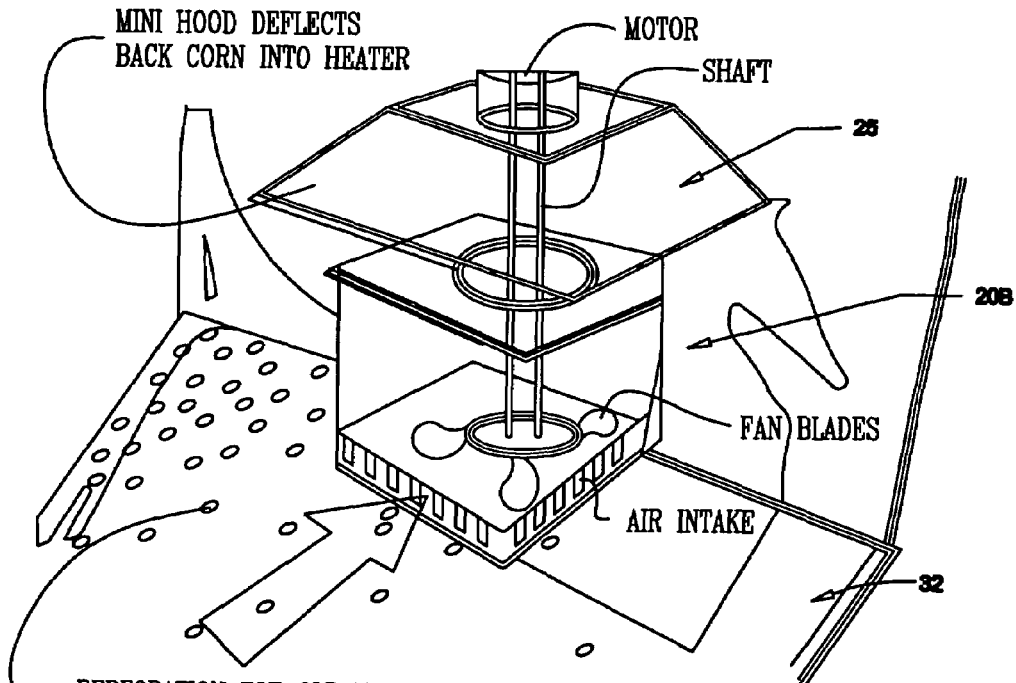
FIGS. 11A-C are perspective views of alternative designs for a hot air popcorn popper according to the present invention.
Figure 11B:
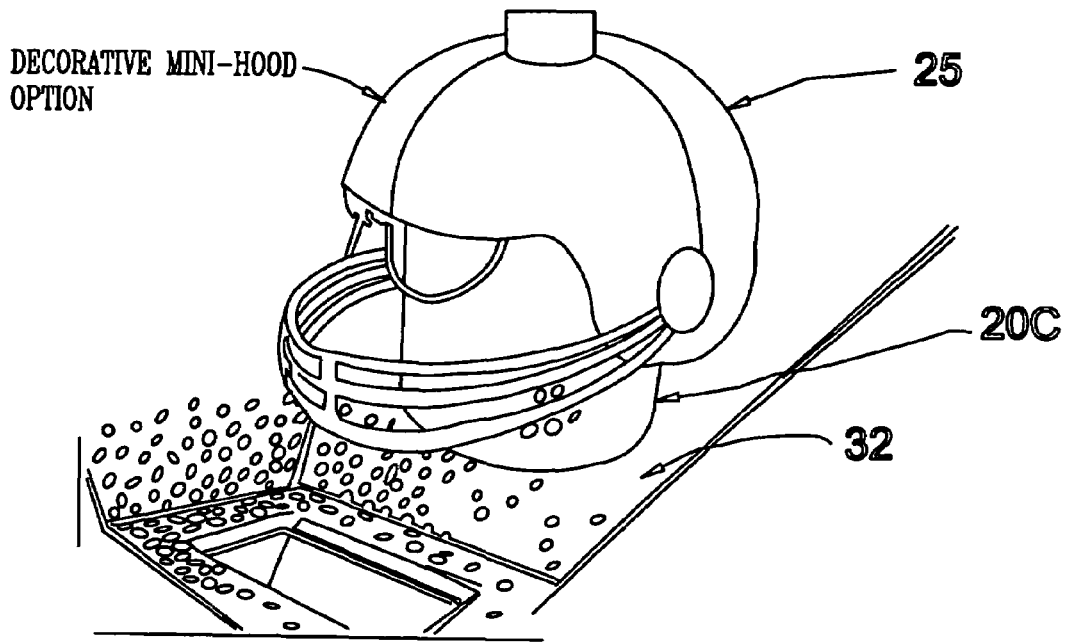
Figure 11C:
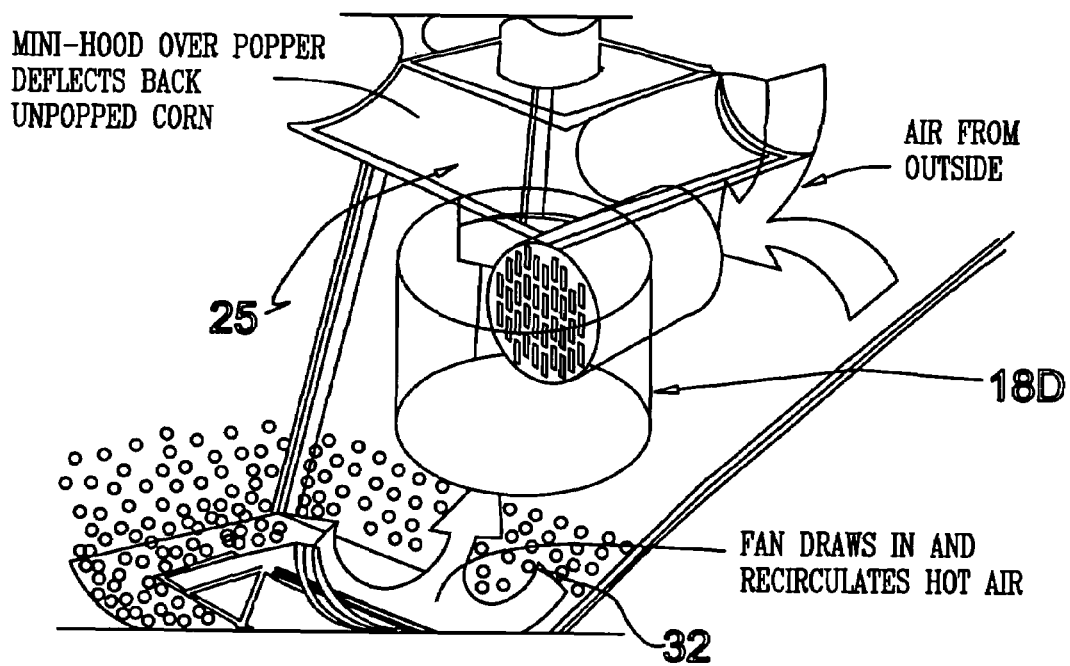

FIG. 8B shows an essentially an off-the-shelf hot air popper. On the other hand, FIGS. 11A-C show alternative designs. Each would utilize some sort of a fan and heating element to pull in air, heat it, and direct it upwardly it a manner that would suspend and cook raw popcorn kernels and then move popped corn pieces out. Some type of a hood 25 likely would be positioned over the popper to help direct unpopped kernels back into the popper and popped corn out into the enclosure of the machine.

As mentioned, hood 25 could be configured in aesthetic shapes as well as function as described (see FIGS. 11A-C). Note FIG. 11C which has an alternative design for drawing in air and circulating it in the hot air popper.

One advantage of the designs shown is that the popping sub-system can be modular in the sense it is a self-contained subsystem that can be replaced essentially as a whole. This could be advantageous regarding maintenance of machine 10. Its replacement could be tool-less. Also, such modularity reduces cleaning and maintenance chores. As can be appreciated by reference to this description and the Figures, other sub-systems can also be essentially modular. The cassette 18 is modular. Its motor and indexing mechanisms could likewise. And, as discussed below, the dispensing sub-system could be essentially modular.

Specifics Regarding Popped Corn Dispensing Subsystem

FIG. 8B shows the basic structure of one embodiment of a dispensing sub-system for collecting popped popcorn and dispensing it externally of machine 10. This embodiment contemplates an auger 30 for that purpose. FIG. 8H gives more detail on such an auger (here designated auger 30A), including specifics regarding size, diameter, and flighting configuration. It is believed, however, that different types of augers can be effective at moving popped popcorn for these purposes. FIG. 8I illustrates embodiment 30B which is essentially a helical wire. Specifics are given in FIG. 8I. The wire can be quite economical, and provides for easier cleaning and maintenance.

Figure 12A:
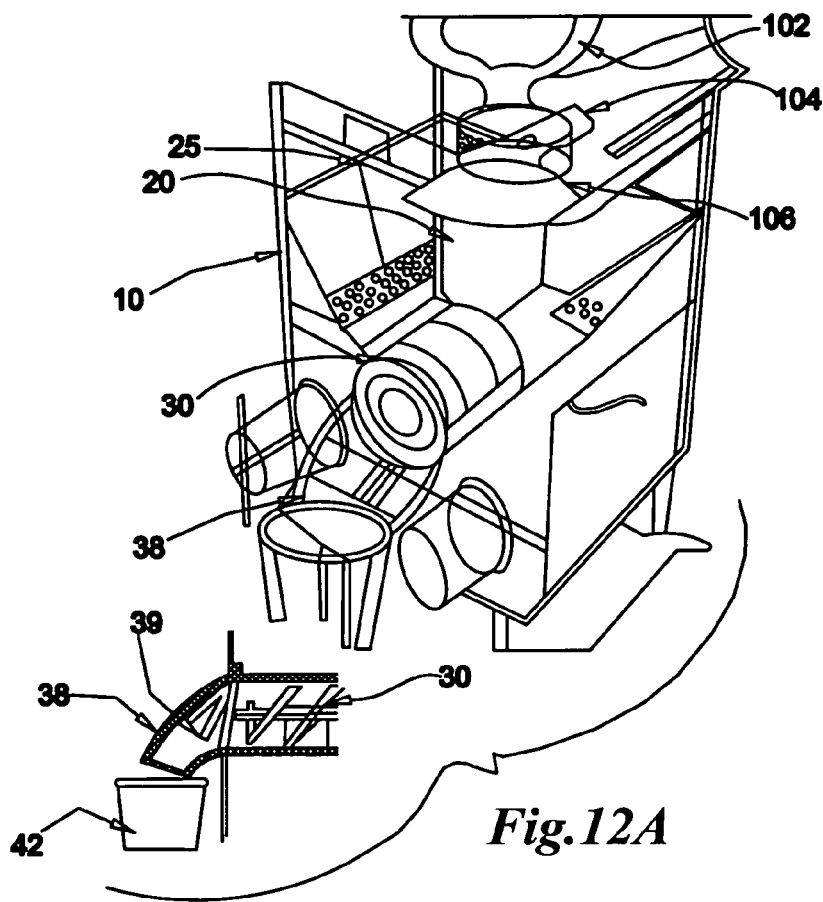
FIGS. 12A-G are depictions of alternative designs for the popped popcorn dispensing mechanism.

FIGS. 12A-G illustrate alternative dispensing mechanisms. FIG. 12A shows an auger embodiment similar to that of FIG. 8H. It also illustrates how a flapper door 39 could cooperate with dispensing shroud to hold popcorn in until auger 30 moves it against door 39.

Figure 12B:
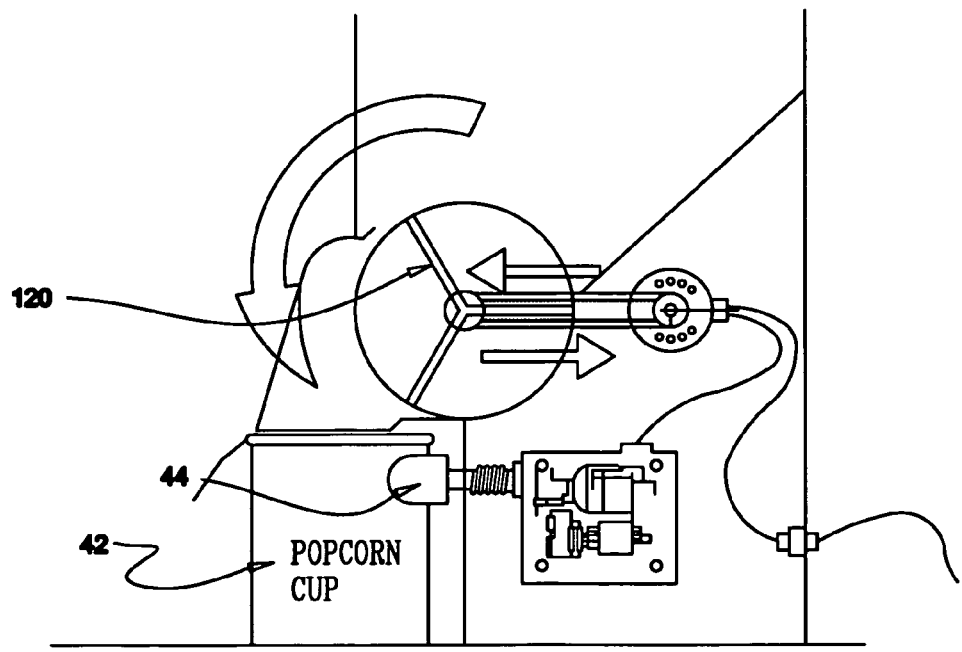

FIG. 12B illustrates a paddle-type member 120 that is rotated by an electric motor when plunger 44 is pushed in. By empirical testing and knowledge of the size of the paddle and the volume of space involved, a certain number of rotations of paddle 120 can dispense a given amount of popped popcorn, and circuitry could stop paddle rotation at a given number of rotations. Or, paddle 120 can simply be rotated for as long as the end-user holds in plunger 44.

Figure 12C:
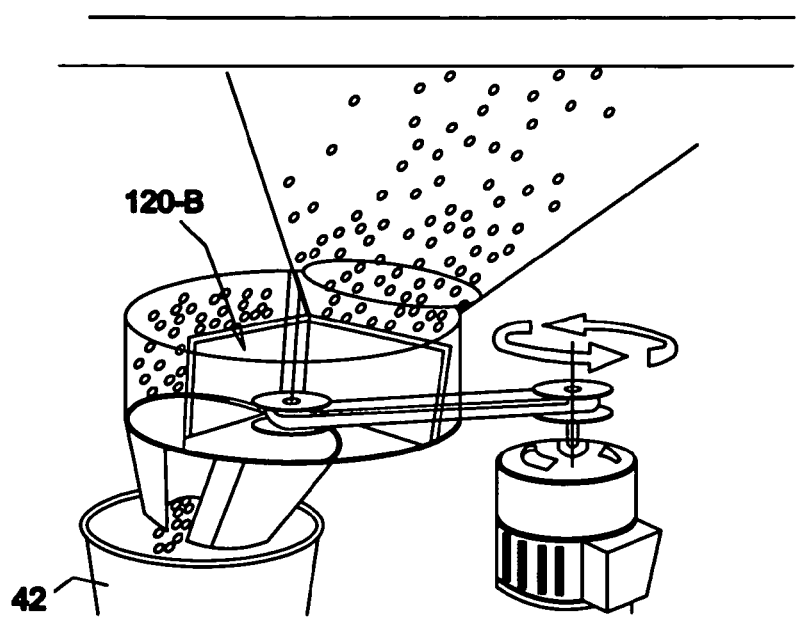

FIG. 12C shows an alternative horizontally rotating paddle dispenser 120B.

Figure 12D:
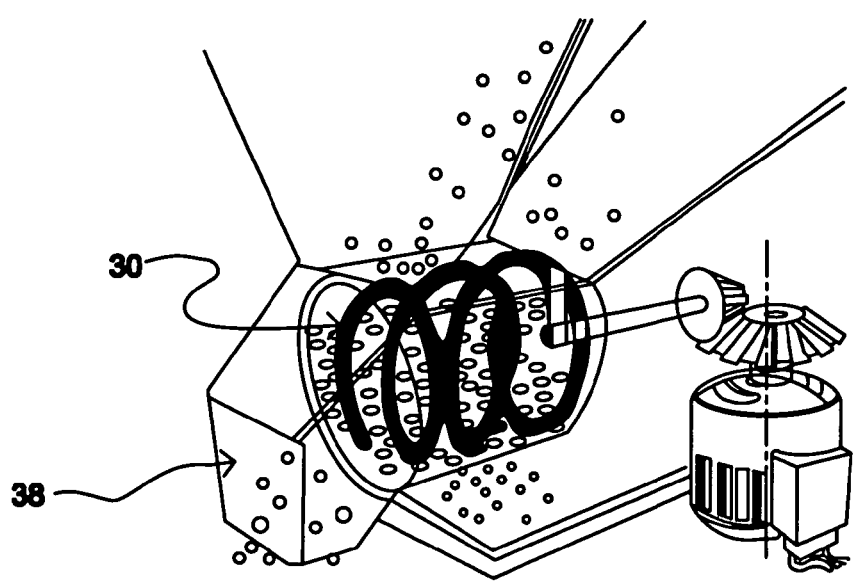

FIG. 12D shows a wire auger. It also illustrates one form of an actuator or motor to rotate it within a perforated cage.

Figure 12E:
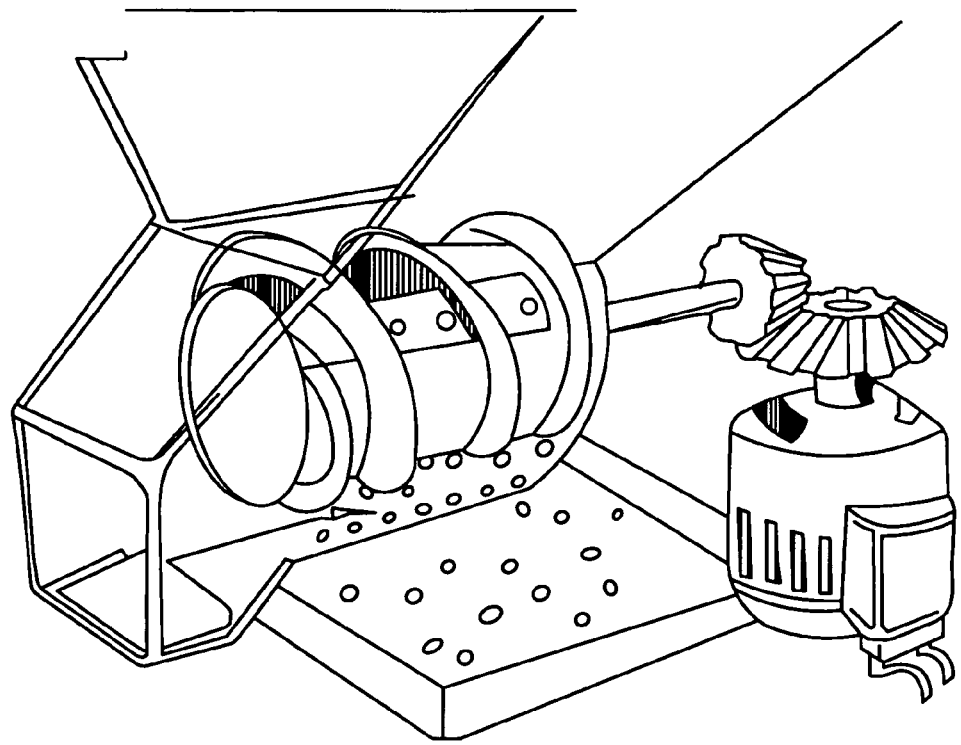

FIG. 12E shows a cylindrical member with auger flighting on its exterior.

Figure 12F:
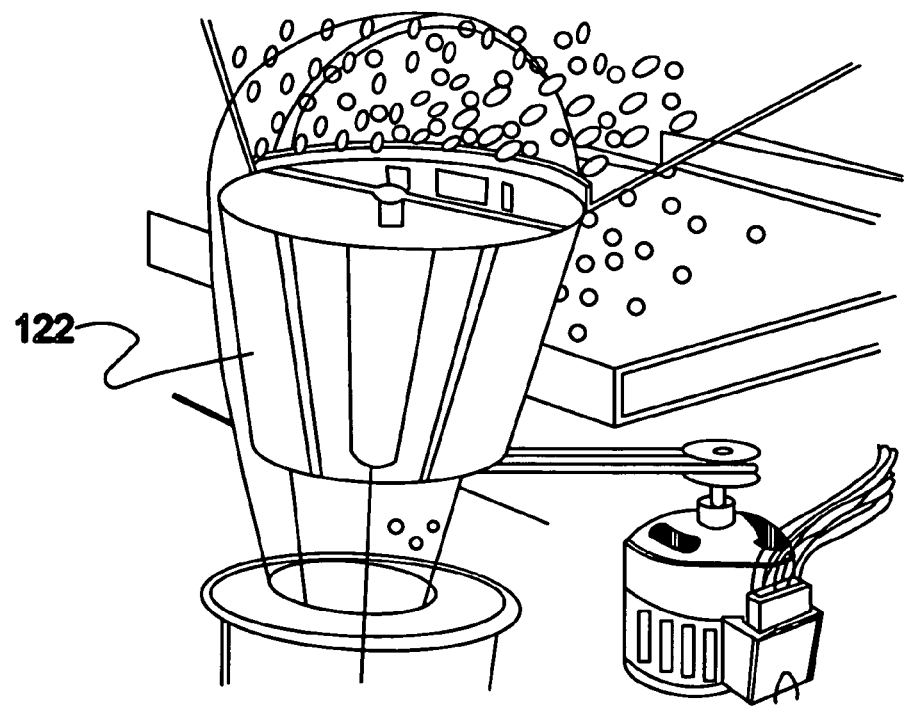

FIG. 12F illustrates a dual chambered cone structure 122. By appropriate covering of parts of the top and/or bottom of structure 122, 180° rotation of structure 122 can deposit a given volume of popcorn to cup 42.

Figure 12G:
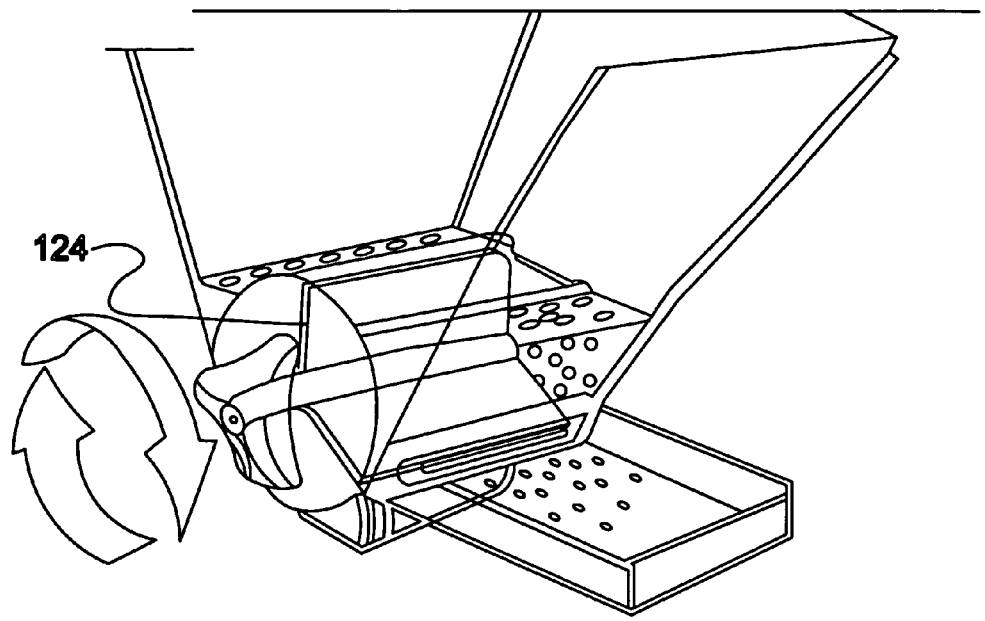

FIG. 12G illustrates a different form of a paddle dispenser. Note this one is manually operated (see reference numeral 124). The user merely turns the knob to dispense a desired amount of popcorn.

As is indicated by a few examples discussed above, it should be appreciated that the dispensing mechanism or system can take many forms and embodiments. The dispensing element can be made of a variety of materials including but not limited to plastic, rubber, or wire.

One possible embodiment for an auger would have increasing diameter from proximal to distal end. The diameter would be smaller at the interior end to start moving popcorn toward dispensing shroud 38. The diameter of the flighting would gradually increase. It is believed that this may deter or reduce compacting of the popped corn. Another potential feature for the solid auger 30A of FIG. 8H would be to include slots or holes in its solid surfaces.

One exemplary embodiment of auger 30A would be 4 inch diameter flights with the entire auger approximately 10 inch long and the flighting being characterized by 2½ inches per revolution (at approximately 10° angle). Other configurations are, of course, possible. A variety of variable helical styles are possible.

As indicated previously, one aspect of the invention is a semi-automatic or almost totally automatic popcorn machine. As illustrated in the drawings, one aspect of automation would be to have the machine automatically popcorn when needed. One contemplated way of accomplishing this is as follows. Using some sort of level sensor, the amount of popcorn above drop pan 32 is monitored. For example, using one or more relatively inexpensive, commercially available, sonar sensors, the level of popcorn in the enclosure of machine 10 can be sensed. If it drops below a certain level, apparatus 10 would automatically drop a dose of raw popcorn kernels into popper 20 and pop that dose. The sensor would operate to continue to monitor such that every time the level of popcorn in the enclosure drops below a preset level, another batch or batches of popcorn would be popped. Doing so would maintain a minimum level of inventory of popped corn "at the ready" in the self-contained housing.

The level which triggers another popping cycle could be set or adjusted. For example, for contemplated high volumes of use, the level could be set higher. For contemplated lower customer traffic, it could be set lower. Alternatively, a sensor is not required. An operator could merely, by sight, decide when the next dose should be popped.

Alternative sensors are possible. Examples could be infrared, photo emitter/detector pair, or even mechanical. The basic function of the sensor would be to identify the time the machine should cycle (carrousel 18 should turn, the mechanism to open a dose should stroke, and dose should be fed to the popper which is running).

The sensor could operate continuously or check only at predetermined intervals or times. It is contemplated it should only be run periodically. For example, if continuous, it may cause the machine to cycle too many times while a batch is being popped to fill the enclosure up above the threshold level. Thus, the sensors might be operated only at certain times or could be ignored during certain times (e.g. when the popper is popping corn).

There could also be some sort of automatic alarm created once cartridge 18 is exhausted to alert the operator. For example, an LED light could come on to inform the operator to replace the cartridge once a sensor senses all positions for all compartments of the cassette 18 have occurred. Some type of photo eye or even a magnetic sensor could trigger once the cassette has rotated past 360 degrees.

It is further contemplated that device 10 have some type of electrical, electronic or digital controller to coordinate the cycling and operation of machine 10. This could be a programmable logic controller (PLC) mounted in cover 14 or otherwise isolated from heat and other environmental factors of machine 10. It could also be some sort of microprocessor. It could even be some sort of electromechanical device such as rotating cams and switches that would turn on and off during a cycle regimen (like electro-mechanical timing motors, cams and switches used in many washing machines).

As can be appreciated by those skilled in the art, the control circuitry to make the machine 10 semi-automatic or automatic can take many forms and embodiments. However, it is contemplated that a relatively inexpensive or economical PLC could be programmed such that one or two switches are turned on and the machine basically would run autonomously. Persons skilled in the art could select and program the appropriate devices to accomplish the functions described herein. One example of the possible functions of machine 10 are described below.

Operation of Exemplary Embodiment

Figure 15A:
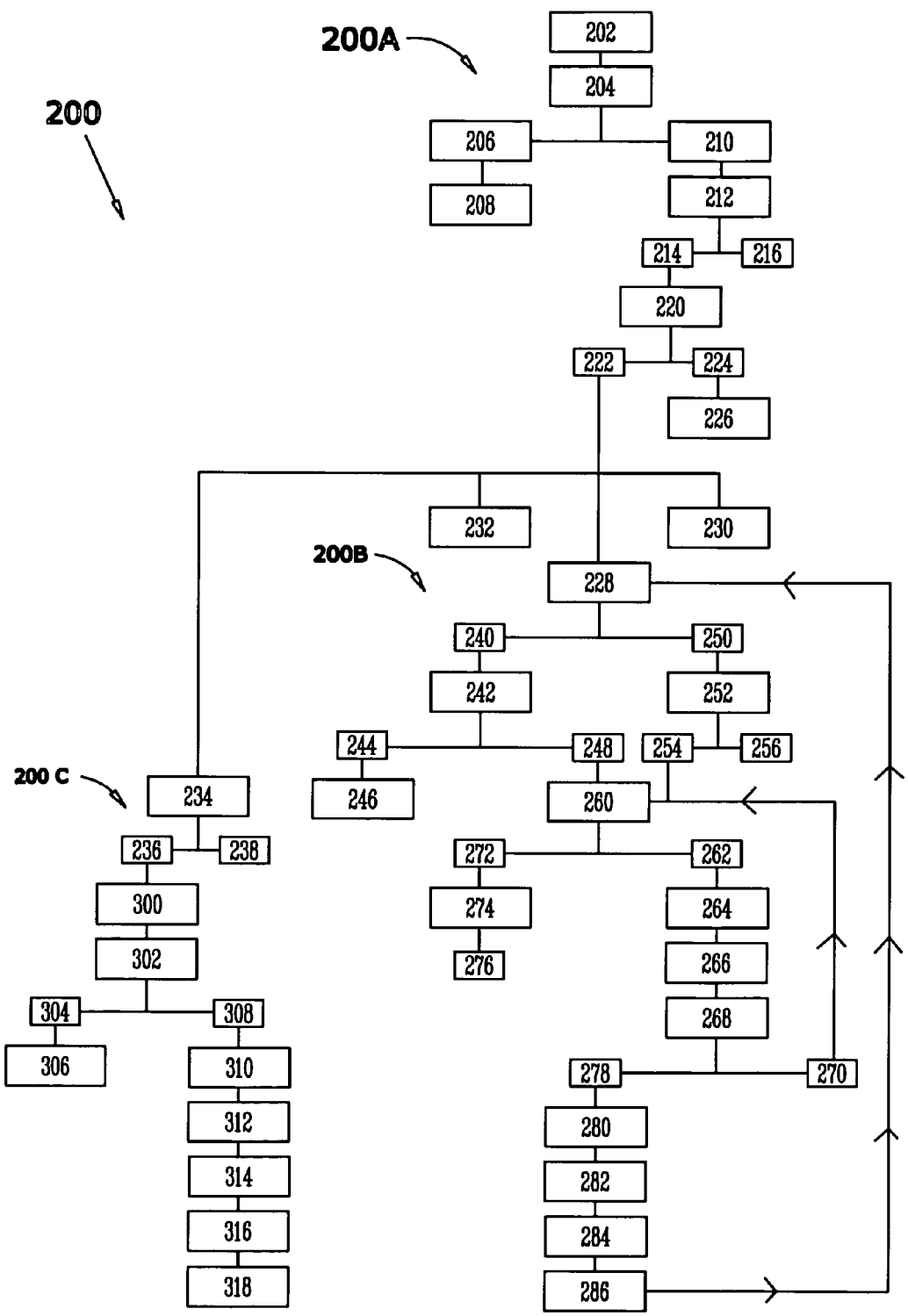
Figures 1, 15B:
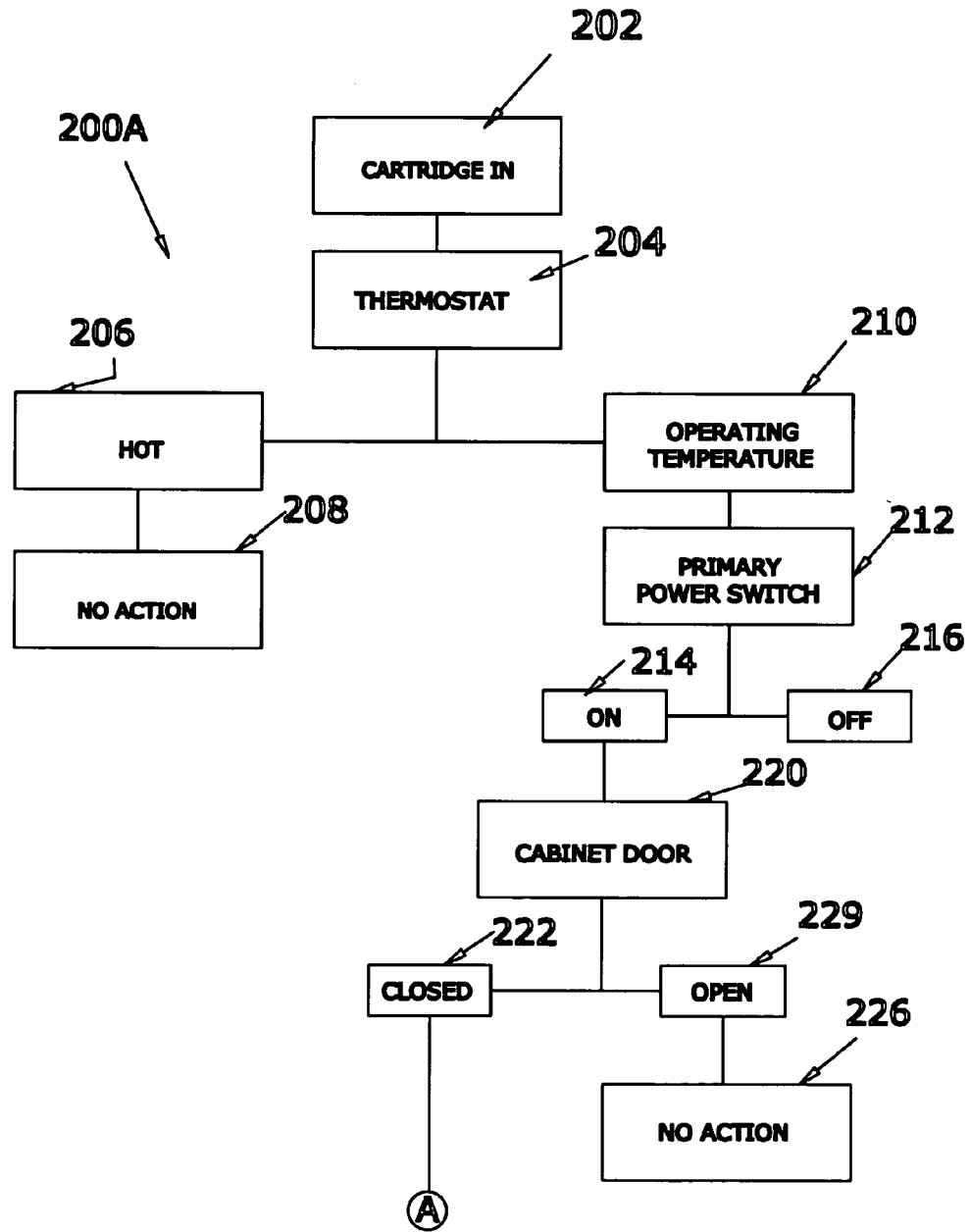
Figures 2, 15B:
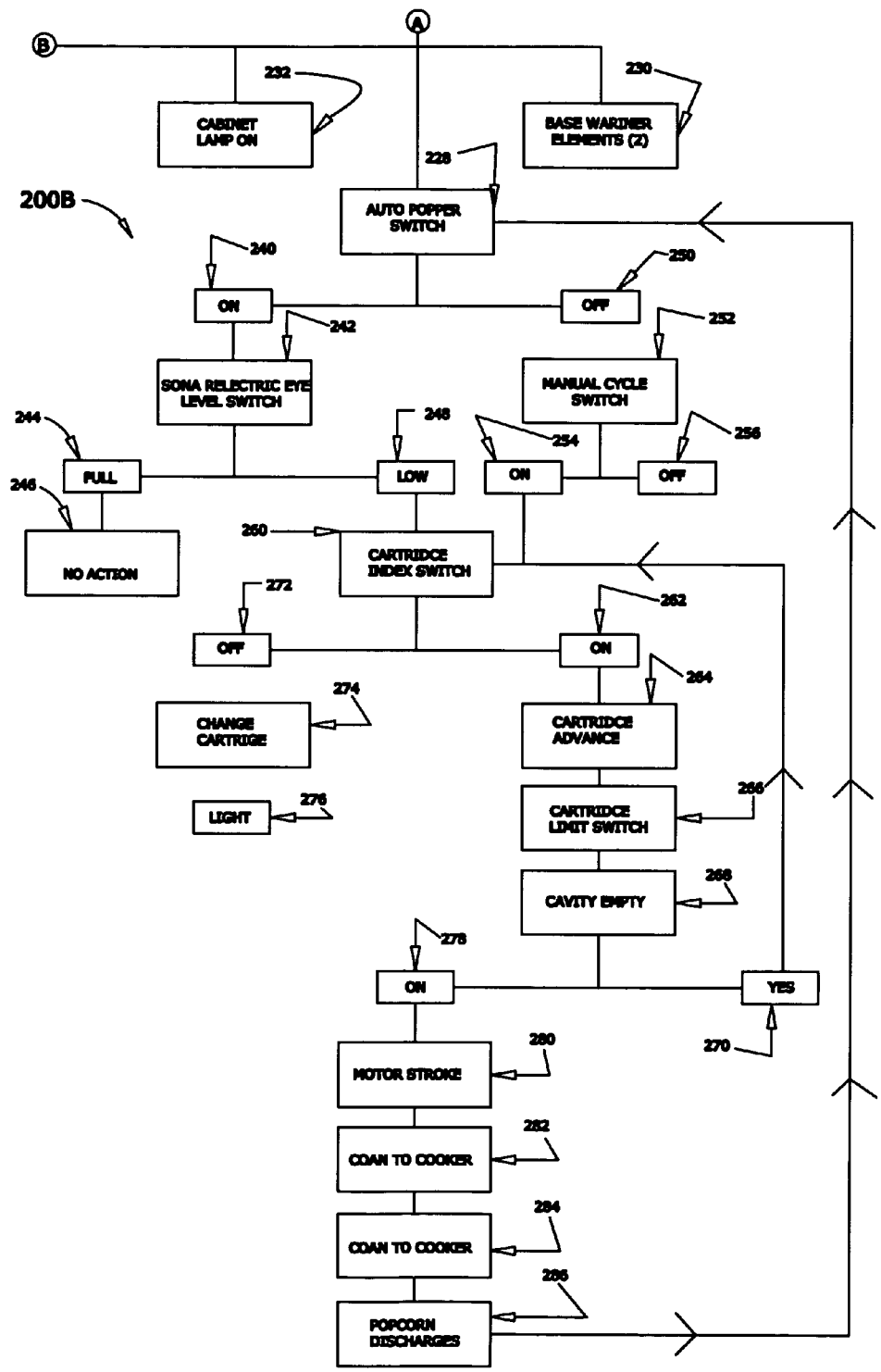
Figures 3, 15B:
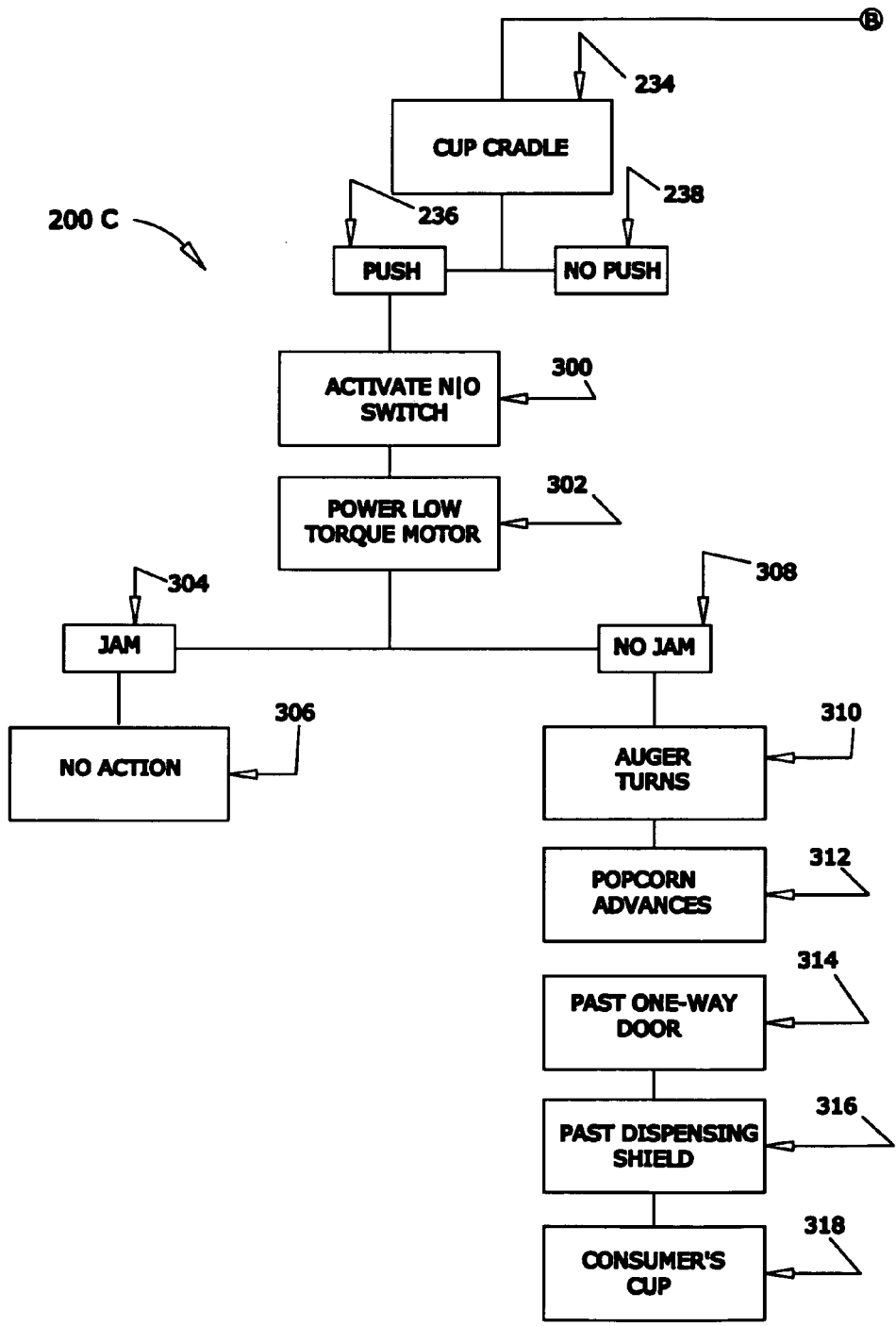

FIG. 15A illustrates a flow diagram of operation of a semi-automatic or automatic machine 10. FIGS. 15B-1 through B-3 are identical to FIG. 15A but show in enlarged form the flow diagram. Reference will be taken primarily to FIGS. 15B-1 through B-3 below. By referring to FIGS. 15B-1 through B-3, in combination with FIGS. 1A and B through FIG. 6, operation of one embodiment of machine 10 will be described.

An operator would insert a cartridge or carrousel 18 in position in machine 10 (see FIG. 1A). It is contemplated there be some sort of spindle or drive the operator will have to fit carrousel 18 over. It could be keyed (see sketch at FIG. 1B) so that the position of carrousel 18 is correct and the operator does not have to do anything but make sure carrousel 18 fits appropriately in that keyed spindle to have cassette 18 appropriately indexed and ready.

A thermostat could be built into the machine 10 to protect from overheating. If heat exceeds a certain level, the thermostat would not allow further operation of the machine (see steps 206 and 208).

If allowable operating temperature is sensed by the thermostat (step 210), the user would push switch 37, the primary power switch, to "on" (step 214). A switch (see FIG. 1B) could sense whether the cabinet door is open or closed. If open, no further operation will be allowed (steps 224 and 226). This forces the operator to make sure the cabinet is closed (step 222).

Figure 2:
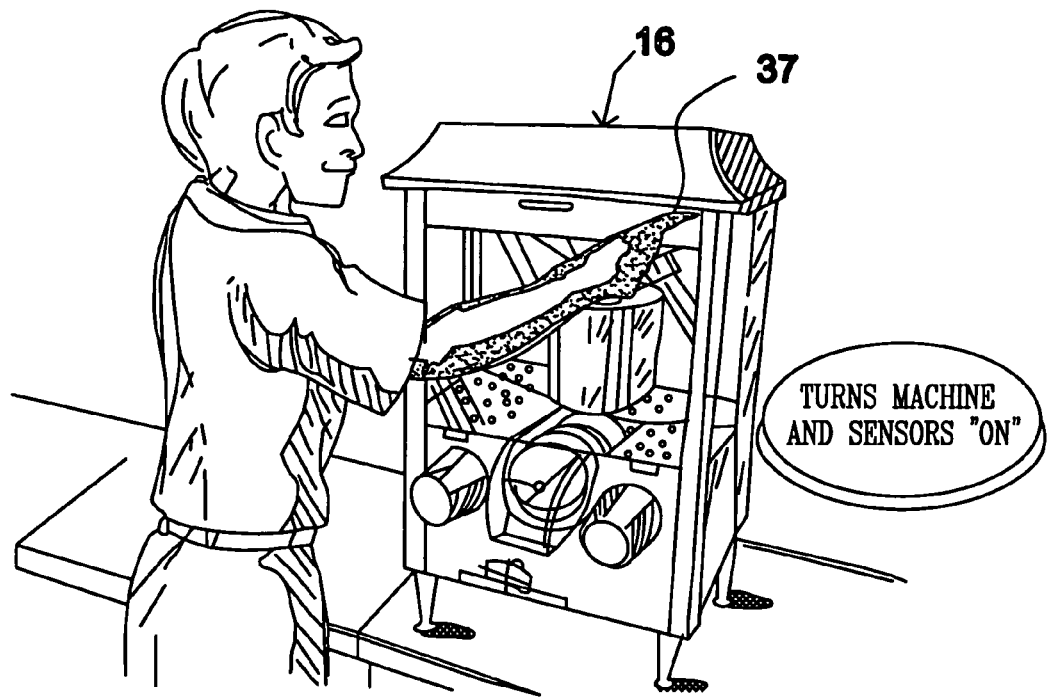
FIG. 2 is similar to FIG. 1 but diagrammatically illustrates the initial starting of the machine.

FIG. 2 illustrates the user turning switch 37 "on". By the preceding simple and quick steps, machine 10 is ready to go.

As shown at FIG. 15B-2, either automatically or by manual switches, optional base warmer elements (commercially available 50 watts each) underneath or around drop pan 32 could be turned on (for keeping popped popcorn warm) (step 230), and a cabinet light could be turned on (step 232).

At this point, before any popcorn has been popped, cup cradle or plunger 44 awaits activation (step 234). If pushed in (step 236), the dispensing routine of FIG. 15B-3 commences. If not pushed (step 238), machine 10 waits regarding any dispensing action.

Figure 3:
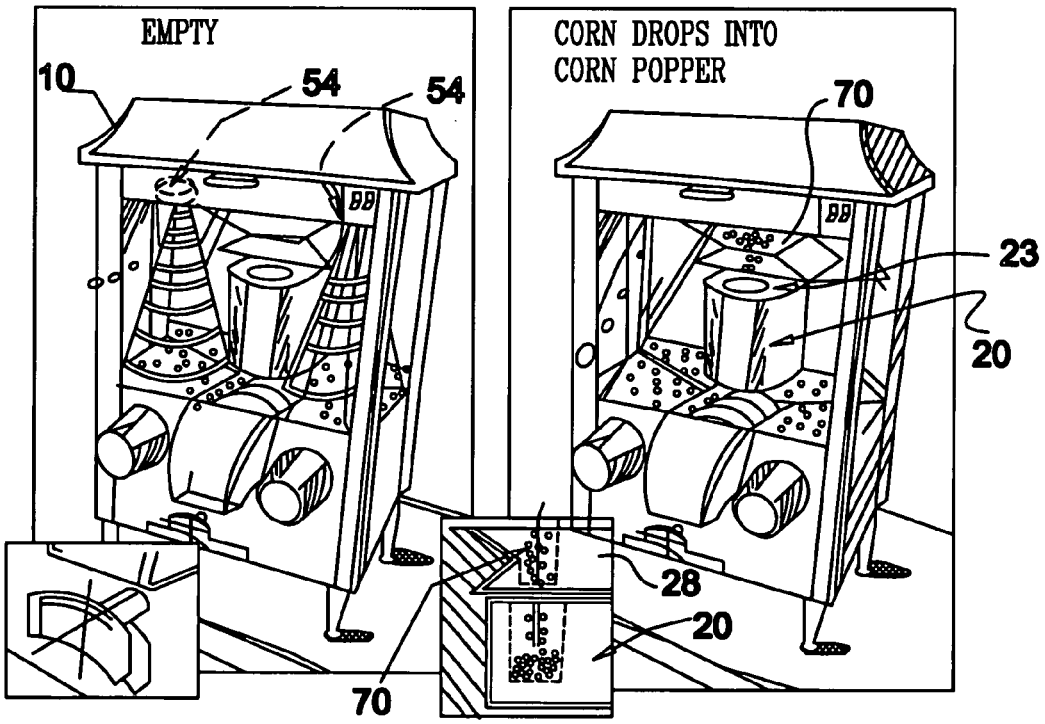
FIG. 3 is similar to FIGS. 1 and 2 but illustrates sensing of amount of popcorn held in the popcorn storage space of the machine, as well as automated reloading of the popper when the sensor indicates it is appropriate.

But, as indicated at FIG. 3, when machine 10 is in automatic mode of operation (step 240), sonar sensors 54 will detect the lack of popcorn in machine 10 (step 248). Popper 20 is on (step 228). A cartridge index switch is checked to make sure the cartridge is not exhausted of popcorn (step 260), and it is then advanced (step 264) until a limit switch instructs it to stop (step 266—e.g. after 22.5 degrees of rotation). Some type of sensor could check to make sure the compartment now indexed over popper 20 is not empty (step 268). If indicated not empty, a motor operates a device to cut, puncture, smash, or otherwise open the compartment (step 280), the raw kernels drop into cooker or popper 20 (steps 282,284), and that dose is popped and ejected from popper 20 onto drop pan 32 (step 286).

Figure 4:
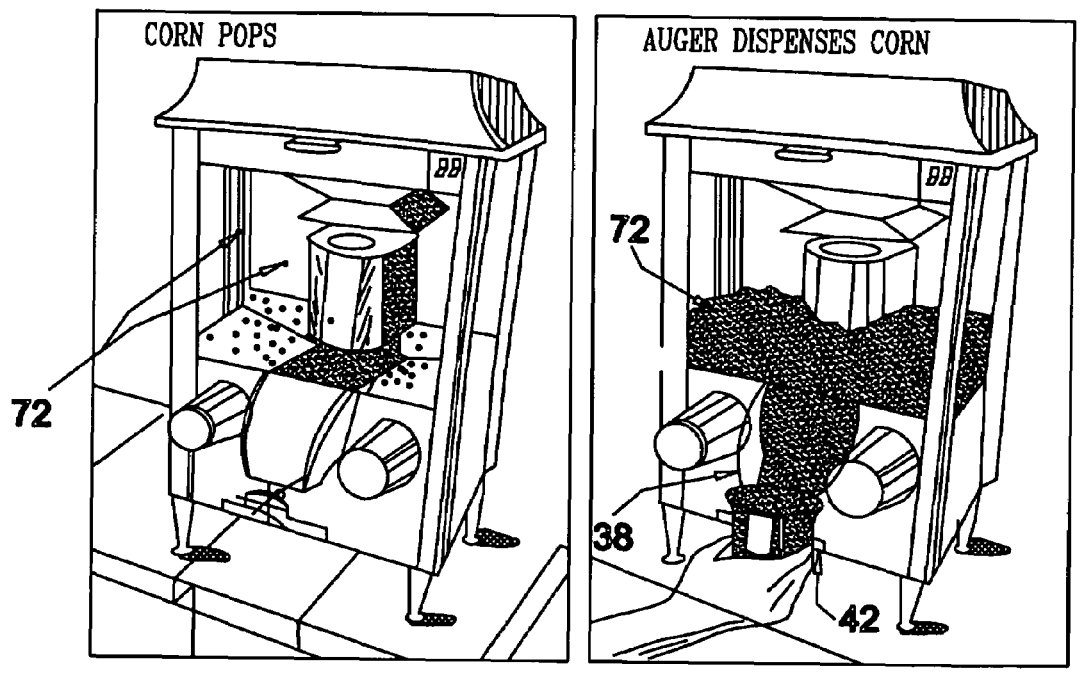
FIG. 4 is similar to FIG. 3 illustrating the further steps of dispension of popcorn to a customer container.

The check to see if the raw kernel cavity at that point in cartridge 18 is full or empty could be accomplished in a variety of ways. For example, some sort of mechanical or electronic device can test if the bottom of the cartridge of that location has been punctured, or by some other way determine if it has already been evacuated. If empty (step 270), machine 10 would loop and advance the cartridge 18 another position (return to step 260). When a non-empty compartment or cavity is sensed (step 278), machine 10 would automatically actuate a motor stroke to punch, split, or otherwise open the cavity or raw kernel corn (step 280) to automatically drop the dose of raw kernels into popper 20 (step 282). Popper 20 is operating and would cook the raw corn (step 284) and, by its operation, automatically discharge popped corn into the enclosure (step 286). FIGS. 3 and 4 show this part of the popping cycle.

Note also, machine 10 automatically checks to see if the cartridge is used up (see steps 272, 274, and 276). In this embodiment, an index switch indicates cartridge 18 has rotated through all compartment positions. If so, it is assumed all compartments of cartridge 18 have been emptied and a light (step 276) turns on to alert the operator to put in a new cartridge 18.

If one batch of popped corn is sufficient to fill the cabinet to the point sensors 54 indicate "full" (step 244), no further action of machine 10 occurs. On the other hand, if additional batches are needed to get the "full" indication, as shown in FIG. 15B-2, the operation loops from step 286 back to step 228 and repeats until sensors 54 indicate "full". If the sensor determines popped corn is above its preset level (step 244), no action is taken to pop more corn (step 246). (See FIG. 4, left diagram, showing corn popping and starting to fill the housing).

Once popped corn is available, the operator or an end-user can operate machine 10 to dispense popped corn to them. As illustrated at FIG. 4, the person merely pushes a cup 42 against plunger or cup cradle 44 (step 236). Cup is automatically positioned under dispensing shroud 38 and a motor turns auger 30 to move popcorn from inside machine 10 into cup 42 (steps 302, 308, 310, 312, 314, 316, 318). Successive end-users or customers can withdraw popcorn (the operation repeats from step 234) (see also FIG. 6) unless a jam of auger 30 is indicated (e.g. by clutch mechanism or stall motor). If a jam is indicated, the auger motor is stopped (step 306) and maintenance will be required.

Figure 5:
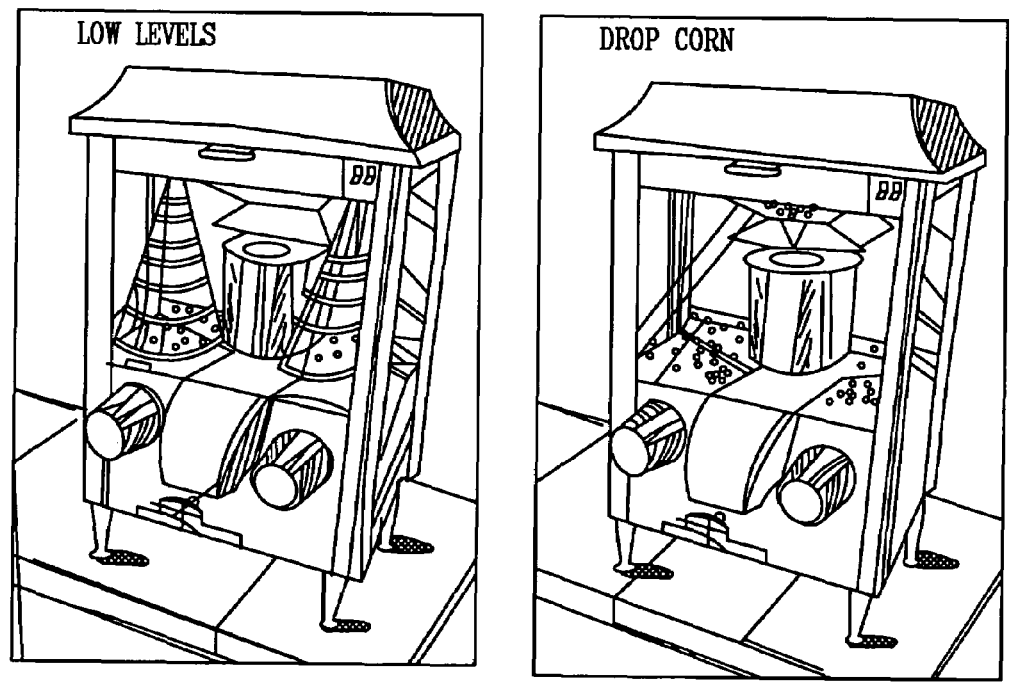
FIG. 5 is similar to FIGS. 3 and 4 and shows additional sensing of level of popcorn in the machine and reloading of the popper for another batch.

However, as indicated at FIG. 5, sensors 54 will monitor the level of popped corn in machine 10. If the sensor indicates "low" (step 248), a new popping cycle or cycles will commence (step 260) with advancing cartridge 18 to a new raw kernel compartment, popping a new batch or batches until the housing is filled enough that sensors 54 indicate "full" again.

FIG. 15B-2 also illustrates a manual cycle mode. Instead of using some sort of sensor to automatically index the cartridge and start another batch of popcorn to be popped, the operator could simply have a manual switch to start the next popping cycle (see steps 252, 254, 256). In other words if an operator wants more popped corn, the operator hits a switch. This would rotate the cartridge (step 260) and continue on with process previously described.

FIG. 15B-3 illustrates the dispensing regimen according to one aspect of the invention. Basically independent of other operation of the machine, except for how it could affect the automatic sensed mode previously described, machine 10 waits for a customer or the operator to place a cup or container against cup cradle or plunger 44 (see FIG. 4). If pushed (step 236) a normally open switch is activated to start a low torque motor (steps 300 and 302) which would rotate an auger or other dispensing mechanism to move popped corn out of dispensing shroud 38 into cup.

It can be appreciated that in this embodiment the circuitry can be configured to either run the auger continuously until the customer removes the cup from cup cradle and plunger 44. This would allow the customer to fill up various size containers to the extent desired. Or alternatively, the auger could be programmed to run for a certain period of time and automatically stop. This action would be intended to dispense a certain limited amount of popcorn to the consumer. For example, some type of timer or counter could limit how long auger 30 runs. By empirical testing, it could be calibrated to a given amount of popcorn to be dispensed.

Figure 6:
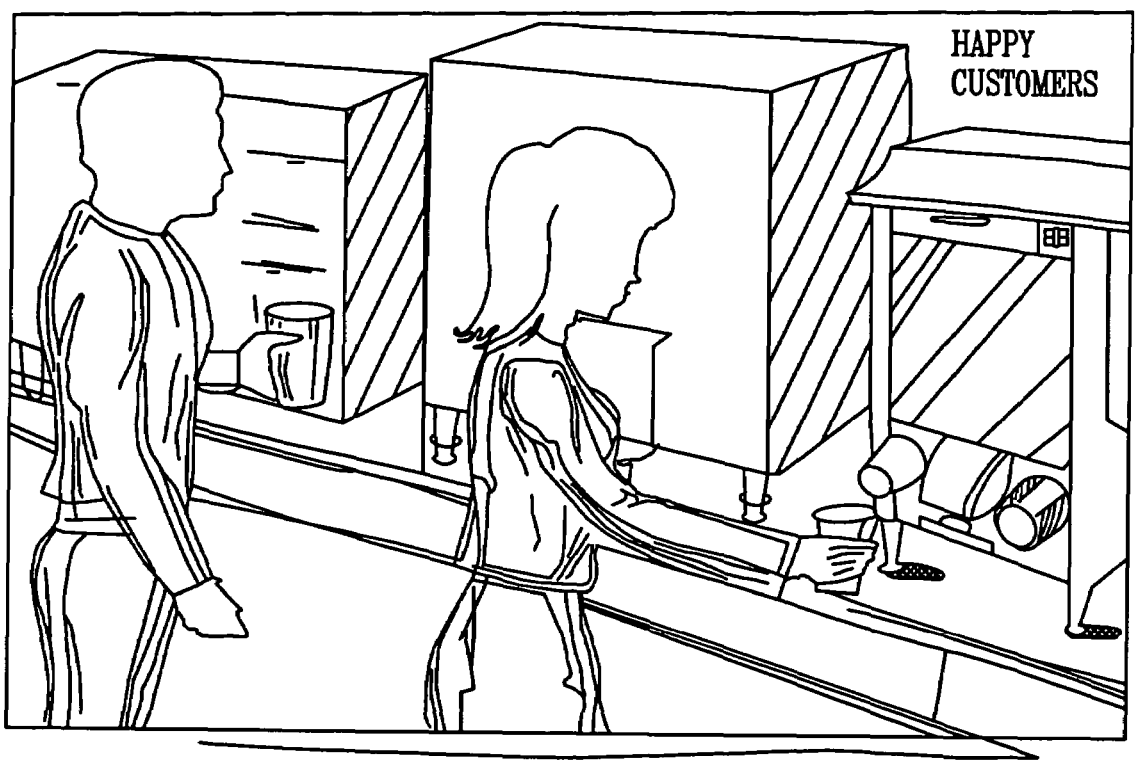
FIG. 6 is a diagrammatic depiction of how consumers would operate this embodiment.
Figure 7A:
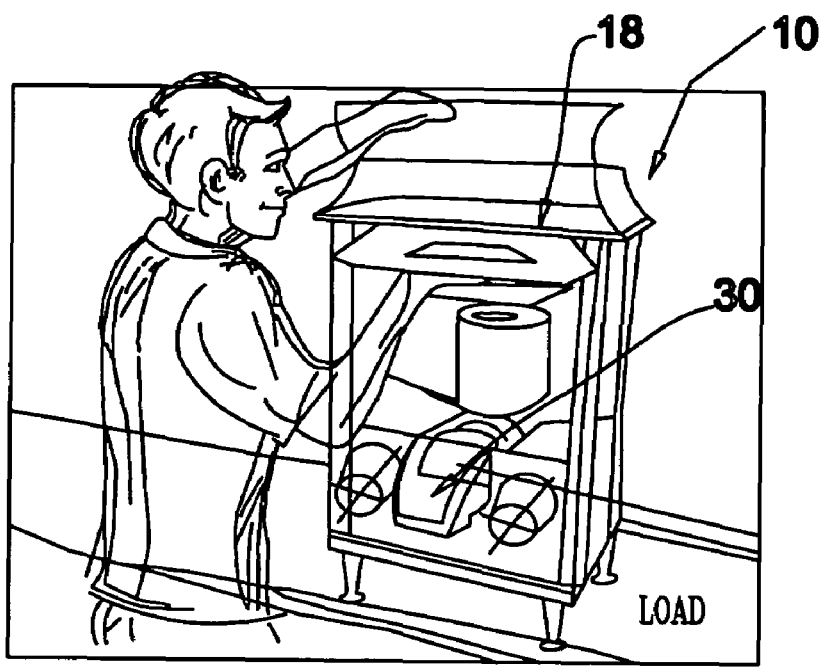
Figure 7B:
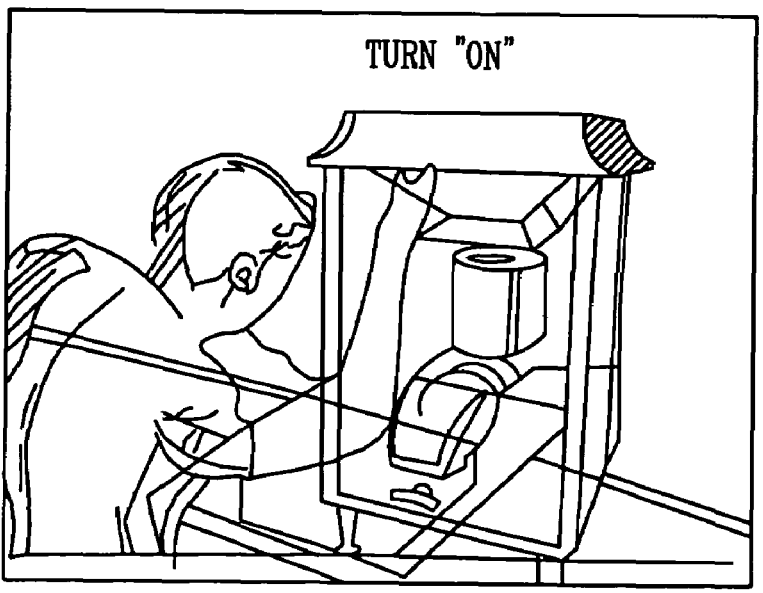
Figure 7C:
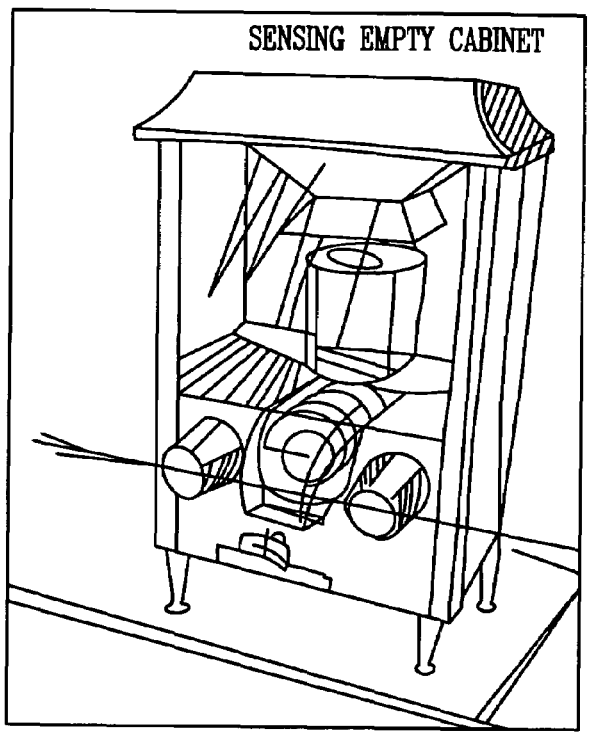
Figure 7D:
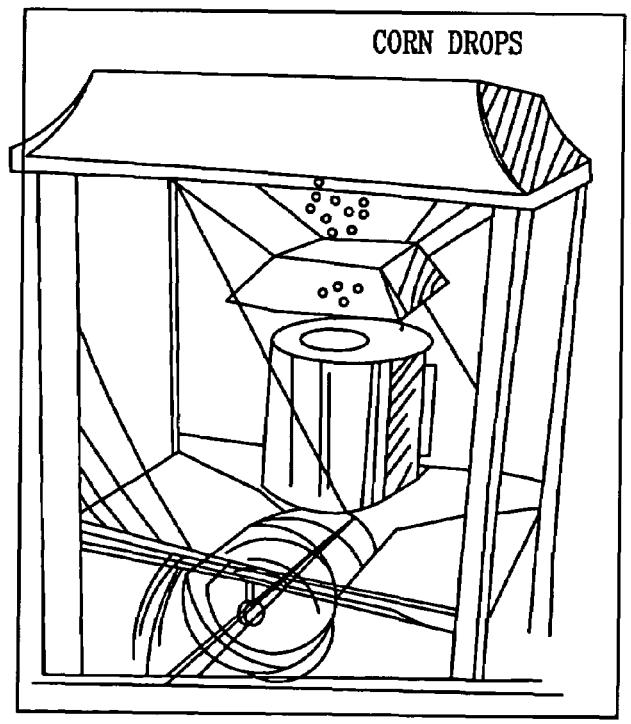
Figure 7E:
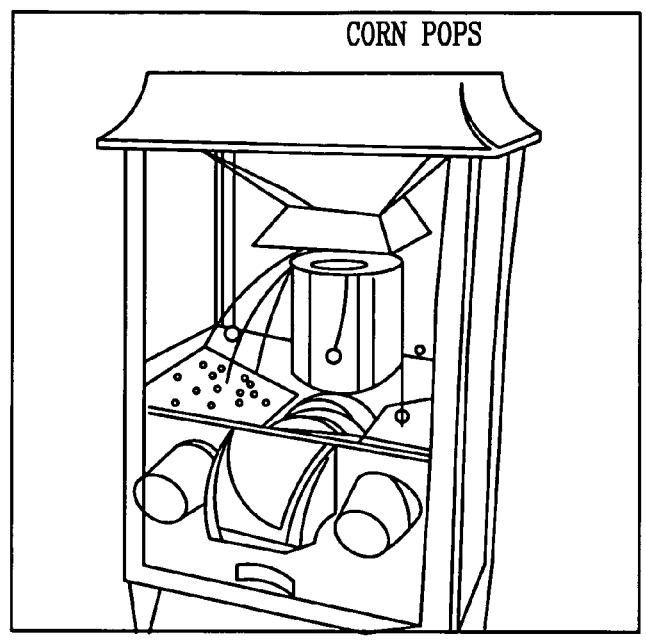
Figure 7F:
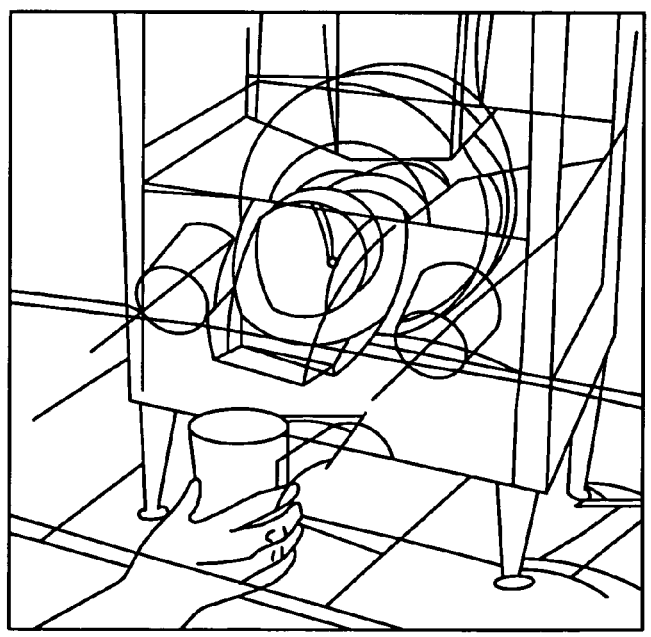

As shown in FIGS. 5 and 6, this embodiment allows a machine, when set on automatic mode, to pop popcorn, fill up a minimum level of inventory, and then allow selected dispension based on the consumer or operator's actions. If the inventory of popped corn drops below a predetermined level, the cycle will start again to recreate that minimum level of inventory to recreate that minimum level of inventory. This allows for multiple customers to get popcorn without the machine running out or without popping excessive inventory.

FIGS. 7A-7I are similar to FIGS. 1-6, illustrating the type of customer interaction with the machine 10 in an automatic mode.

Options and Alternatives

It will be appreciated that the present invention can take many forms and embodiments. The exemplary embodiments discussed herein are by example only and not by limitation to the invention. Variations obvious to those skilled in the art will be included within the invention.

For example, the configuration of the materials used for the various components of the invention can vary. The figures show a variety of configurations. Aesthetic variations are possible. See for example, FIGS. 9A through 9F regarding a variety of configurations for the housing itself.

Variations for the subsystems, including the raw kernel dosage mechanism, hot air popping system, and the popcorn dispensing subsystem, have been given. These are by example only, and not be limitation. Others are possible. For example, instead of a carrousel 18 or other multi-prepackaged dose arrangement, a bulk container 102 (e.g. 64 ounces of raw kernels of popcorn) with a snap-on neck could be removably positioned in some sort of a receiver (see FIG. 13A). A tamper-resistant and non-removable silicone valve closure 104, or other retainer could be positioned over the mouth of the bottle. A foil seal could be placed over the bottle while it is in a storage position waiting for installation on the machine.

Figure 13A:
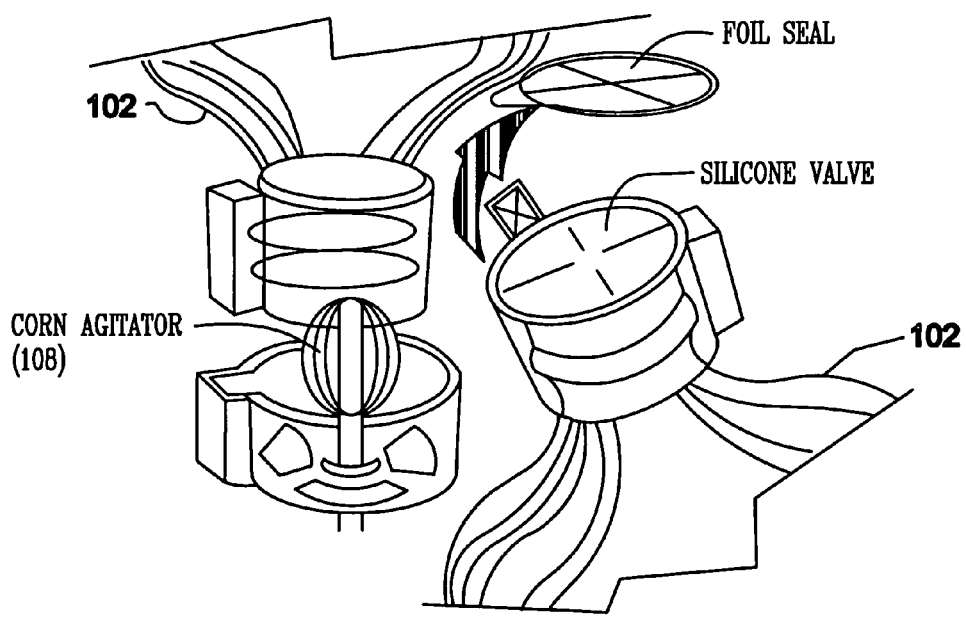
FIGS. 13A-E are diagrammatic depictions of an alternative unpopped popcorn seed source for the machine, a bulk container with a valve, and alternative seed delivery mechanisms to a popper.

In FIG. 13A, the receiver could include a corn agitator 108 that could serve both to open up the silicone valve when the bottle 102 is installed, and also move the raw kernels around at that position in the bottle to make sure they can drop by gravity and do not trap, block or bridge the bottle opening.

Figure 13B:
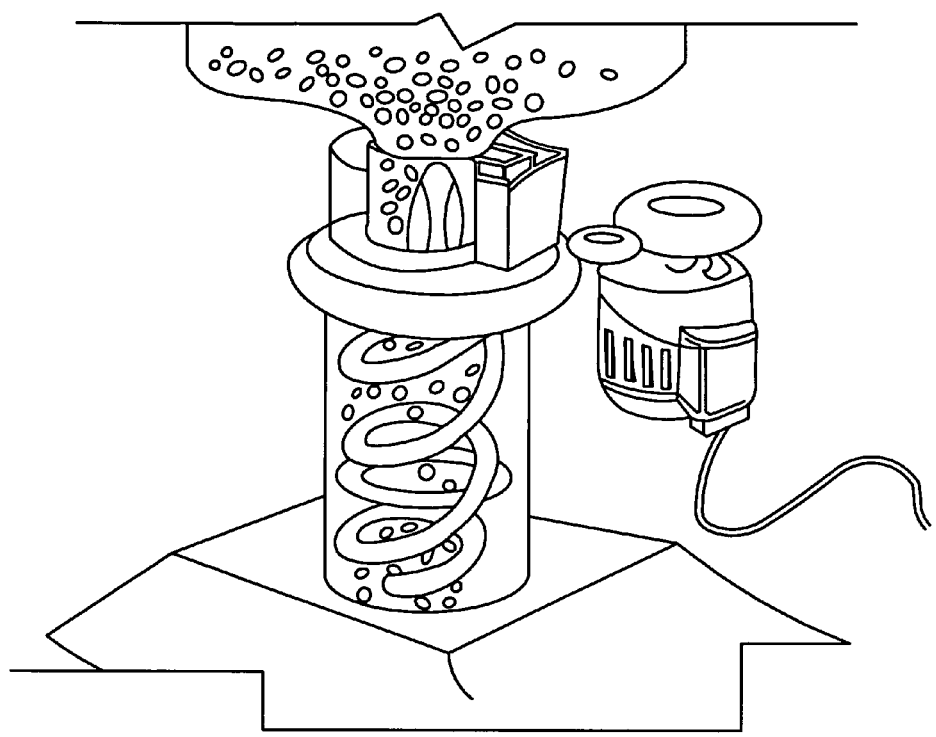
Figure 13C:
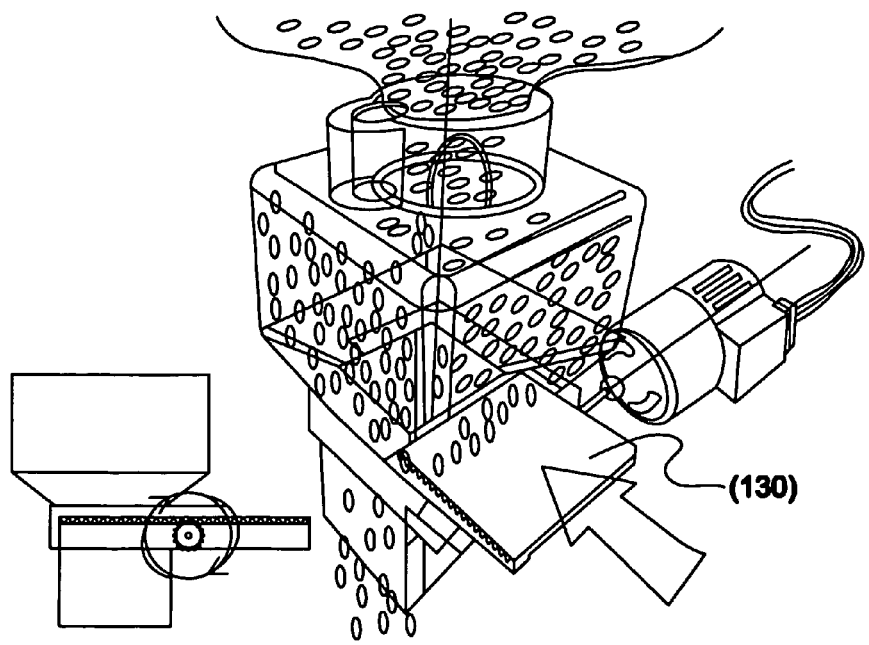
Figure 13D:
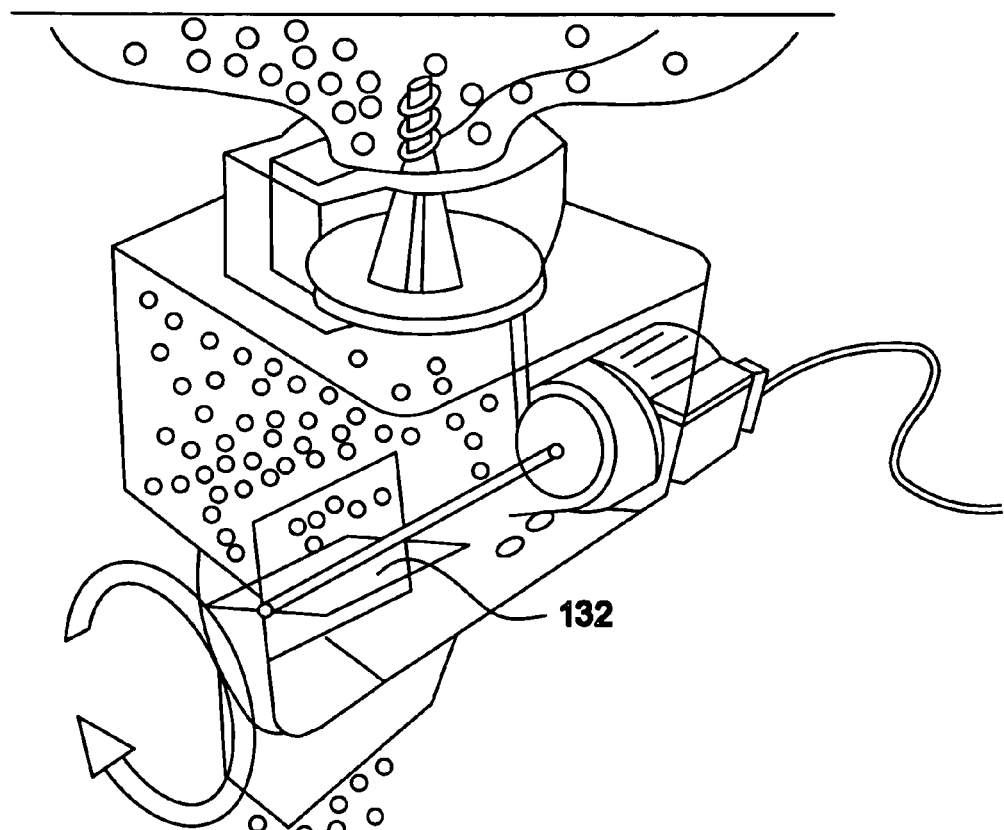
Figure 13E:
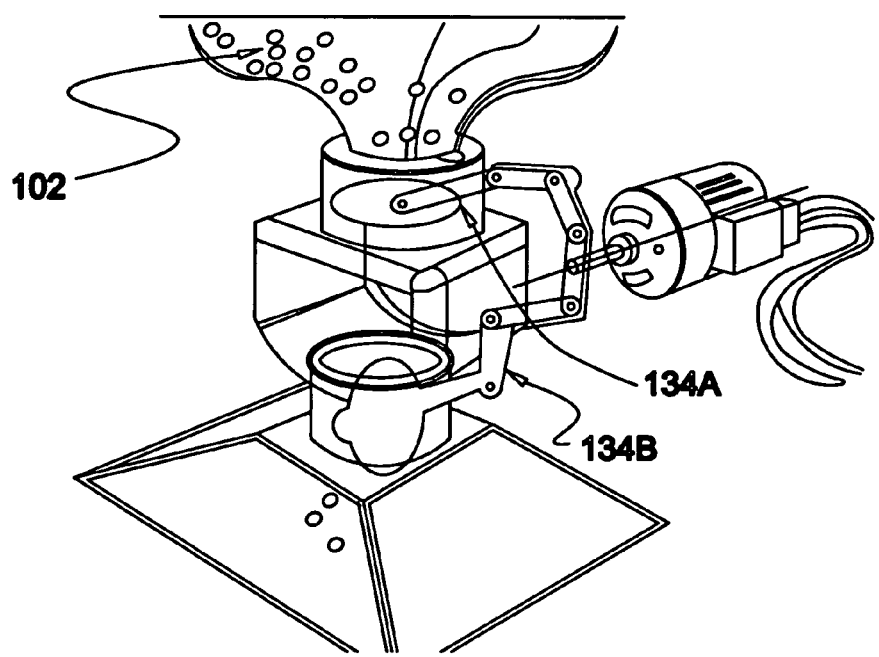

As shown in FIGS. 13B-E, there could be included some sort of a metering or gate system to then ensure only a predetermined dose quantity of raw kernels is given to the popper. FIG. 13B illustrates there could be some type of cannula 128 and vertical auger that is rotated by a motor to meter raw kernels to the popper. FIG. 13C shows a gear driven slide plate. FIG. 13D shows a motorized paddle auger. FIG. 13E shows a dual valve system to first open and allow a 4 ounce reservoir to be filled, then closed and at the appropriate time a lower valve 134B open to drop the 4 ounce dose into the popper.

Optionally there could be some sort of a screen or other catching device that would filter out any non-raw popcorn kernels. For example, with the carrousels, there could be pieces of tin foil or paper that would try to fall into popper 20. Such a screen would hopefully catch most of those.

Regarding the popping mechanism, a variety of air popping devices are possible. Additionally, a microwave could be possible as the popping mechanism. There could be some sort of delivery system of a dose into the microwave, and then a removal system for the popped popcorn after it is done. One possibility would be to have a carrousel each with individual bags with appropriate doses that would be loaded into a microwave and unloaded still in the bag but popped. Some sort of a plunger or cutter, such as previously described, could puncture the bag and drop the corn into a drop pan. The bag could then be ejected.

An auger or similar type rotating dispensing mechanism has previously been described. However, some type of conveyor belt could also be utilized. It could have a flat conveyor, a v-shaped conveyor, or even paddles on the conveyor belt. This could have the advantage of being less destructive to the popped corn.

A variety of off-the-shelf sensors for level of popcorn are available commercially.

The machine is not limited to any particular size of cup. Forty-eight ounce cups are envisioned to be one example. The machine has the advantage of being able to be used with multiple sizes of cups.

A cycle for the machine could be made to have a fixed period. It is believed with the air popper that it might be advantageous to run it for longer than a normal period of time. For example, testing is indicated 3½ minutes is okay for a 4 ounce dose of raw kernels. However, by running an extra minute for a total of 4½ minutes, it is more likely to get rid of more "old maids".

Other options and alternatives are, of course, possible.

What is claimed is:

1. An apparatus for popping popcorn comprising:
   a. a popcorn popper having an unpopped corn input;
   b. a container having a plurality of compartments, each having one dose of unpopped corn;
   c. a dosing mechanism adapted to provide one dose at a time of unpopped corn to the popcorn popper, the dosing mechanism comprising an openable outlet through which the dose can fall by gravity, the openable outlet comprising a frangible layer on the container adapted to be punctured.

2. The apparatus of claim 1 wherein the popcorn popper is an air popper.

3. The apparatus of claim 1 wherein the dosing mechanism further comprises a punch adapted to puncture the frangible layer.

4. The apparatus of claim 3 further comprising an actuator operatively connected to the punch to move the punch, upon an actuation signal, towards and away from a puncture position relative the frangible cover.

5. The apparatus of claim 1 further comprising an actuator operatively connected to the multiple compartment container to move, upon an actuation signal, each compartment of the multiple compartment container sequentially to an index or dosing position relative the popcorn popper.

6. The apparatus of claim 5 wherein the container comprises a removable tray or cartridge.

7. The apparatus of claim 1 further comprising a cabinet in or on which are placed the popcorn popper, the container, and the dosing mechanism.

8. The apparatus of claim 7 wherein the cabinet includes a popped corn hopper.

9. The apparatus of claim 8 further comprising a dispensing mechanism in communication with the hopper and adapted to dispense, upon actuation, popped corn from the hopper.

10. The apparatus of claim 9 wherein the dispensing mechanism is operatively connected to an actuator that dispensing popped corn in a predetermined amount upon receipt of an actuation signal.

11. The apparatus of claim 8 further comprising a sensor to sense when popped corn in the hopper is less than a predetermined amount and, if sensed, adapted to instigate an actuation signal for the dosing mechanism.

12. An apparatus for popping popcorn comprising:
   a. a popcorn popper having an unpopped corn output;
   b. a popped corn hopper adapted to retain multiple servings of popped corn;
   c. a dispensing mechanism in communication with the hopper and adapted to dispense, upon actuation, one or more servings of popped corn from the hopper; and
   d. a dosing mechanism adapted to provide one dose at a time of unpopped corn from an unpopped popcorn container to the popcorn popper wherein the container comprises multiple compartments, each compartment having one dose, the dosing mechanism comprising an openable outlet through which the dose can fall by gravity, the openable outlet comprising a frangible layer on the container adapted to be punctured.

13. The apparatus of claim 12 wherein the popcorn popper is an air popper.

14. The apparatus of claim 12 wherein the multiple compartment container is operatively connected to an actuator that can move each compartment of the multiple compartment container, upon an actuation signal, sequentially to the dosing position.

15. The apparatus of claim 12 further comprising a cabinet in or on which are placed the popcorn popper, the hopper and the dispensing mechanism.

16. The apparatus of claim 12 further comprising a sensor to sense when popped corn in the hopper is less than a predetermined amount and, if sensed, adapted to instigate an actuation signal adapted to signal a new popping cycle to begin to re-fill the hopper.

17. The apparatus of claim 12 wherein the dispensing mechanism comprises an augur having an inlet in communication with the hopper and an outlet.

18. An apparatus for popping corn having the advantage of providing one or more servings by self-serve or operator operation in a self-contained unit comprising:
   a. a cabinet;
   b. a popcorn popper in the cabinet having an unpopped corn input and a popped corn output;
   c. a container of a plurality of doses of unpopped corn operatively positionable in or on the cabinet;

d. a dosing mechanism in communication with the container and adapted to provide one dose at a time of unpopped corn to the popcorn popper, the dosing mechanism comprising an openable outlet through which the dose can fall by gravity, the openable outlet comprising a frangible layer on the container adapted to be punctured;

e. a popped corn hopper in the cabinet adapted to retain multiple servings of popped corn;

f. a dispensing mechanism in communication with the hopper and adapted to dispense, upon actuation, one or more servings of popped corn from the hopper.

19. The apparatus of claim 18 further comprising actuators operatively connected to the dosing mechanism and dispensing mechanism to allow actuation of each upon receipt of an actuation signal.

20. The apparatus of claim 19 further comprising an electrical control circuit in operative communication with the actuators.

21. The apparatus of claim 20 wherein the control circuit produces actuation signals.

22. The apparatus of claim 21 further comprising a sensor, in electrical communication with the control circuit, adapted to sense when the amount of popped corn in the hopper is below a pre-determined amount and causes the control circuit to produce an actuation signal for the dosing mechanism automatically.

23. The apparatus of claim 18 wherein each of the popcorn popper, container, dosing mechanism, and dispensing mechanism is modular so that each can be independently replaced as a modular unit.

24. An apparatus for popping popcorn comprising:

a. a popcorn popper having an unpopped corn input and a popped corn output, the popcorn popper comprising an air popper;

b. a container comprising multiple compartments, each compartment having one dose;

c. a dosing mechanism adapted to provide one dose at a time of unpopped corn from the container to the unpopped corn input of popcorn popper, the dosing mechanism comprising an openable outlet through which the dose can fall by gravity, the openable outlet comprising a frangible layer on the container adapted to be punctured.

25. The apparatus of claim 24 further comprising a cabinet in or on which are placed the popcorn popper, the hopper and the dispensing mechanism.

26. The apparatus of claim 24 further comprising a sensor operatively positioned relative the hopper to sense when popped corn in the hopper is less than a pre-determined amount and, if sensed, adapted to instigate an actuation signal for the dosing mechanism.

27. The apparatus of claim 26 wherein the sensor comprises sonar.

* * * * *